US011100652B2

(12) United States Patent
Gao et al.

(10) Patent No.: US 11,100,652 B2
(45) Date of Patent: Aug. 24, 2021

(54) METHOD AND SYSTEM FOR FEATURE TRACKING USING IMAGE PYRAMIDS

(71) Applicant: SZ DJI TECHNOLOGY CO., LTD., Guangdong (CN)

(72) Inventors: Mingming Gao, Guangdong (CN); Kang Yang, Guangdong (CN)

(73) Assignee: SZ DJI TECHNOLOGY CO., LTD., Guangdong (CN)

(*) Notice: Subject to any disclaimer, the term of this patent is extended or adjusted under 35 U.S.C. 154(b) by 105 days.

(21) Appl. No.: 16/474,457

(22) PCT Filed: Jan. 24, 2017

(86) PCT No.: PCT/CN2017/072448
§ 371 (c)(1),
(2) Date: Jun. 27, 2019

(87) PCT Pub. No.: WO2018/137132
PCT Pub. Date: Aug. 2, 2018

(65) Prior Publication Data
US 2019/0340772 A1 Nov. 7, 2019

(51) Int. Cl.
*G06K 9/46* (2006.01)
*G06T 7/246* (2017.01)
(Continued)

(52) U.S. Cl.
CPC ............ *G06T 7/248* (2017.01); *G06K 9/6202* (2013.01); *G06T 7/269* (2017.01); *G06T 2207/20016* (2013.01)

(58) Field of Classification Search
CPC .................... G06T 7/248; G06T 7/269; G06T 2207/20016; G06T 7/246;
(Continued)

(56) References Cited

U.S. PATENT DOCUMENTS 6,785,427 B1    8/2004  Zhou
2011/0116711 A1   5/2011  Wang et al.
(Continued)

FOREIGN PATENT DOCUMENTS

CN    101923719 A    12/2010
CN    103913588 A     7/2014
(Continued)

OTHER PUBLICATIONS

International Search Report and Written Opinion for Application No. PCT/CN2017/072448, dated May 16, 2017, 6 pages.

*Primary Examiner* — Charlotte M Baker
(74) *Attorney, Agent, or Firm* — Nicholson De Vos Webster & Elliott LLP

(57) ABSTRACT

Described herein are systems, methods, storage media, and computer programs for tracking a plurality of feature points in a first image and a second image. In one embodiment, a first layer of a first image pyramid for the first image and a first layer of a second image pyramid for the second image are obtained. Based on expected pixel locations of the plurality of feature points in the first layer of the second image pyramid, a feature point is selected from the plurality of feature points. For the feature point, a first pixel in the first layer of the first image pyramid is determined, and a second pixel in the first layer of the second image pyramid is determined, where the first pixel substantially matches the second pixel.

20 Claims, 11 Drawing Sheets

(51) Int. Cl.
*G06T 7/269* (2017.01)
*G06K 9/62* (2006.01)

(58) Field of Classification Search
CPC ........ G06T 2207/10016; G06K 9/6202; G06K 9/00671; G06K 9/4671
USPC .................................................. 382/201, 108
See application file for complete search history.

(56) References Cited

U.S. PATENT DOCUMENTS

2013/0336540 A1* 12/2013 Zhang .................. G06T 7/11
   382/108
2019/0028645 A1* 1/2019 Satoh ................ H04N 5/23218

FOREIGN PATENT DOCUMENTS

| CN | 104517287 A | 4/2015 |
| CN | 105930858 A | 9/2016 |

* cited by examiner

300

For a point u in Image I, find corresponding location v in Image J

302. Build pyramids for Images I and J

304. Initialization of pyramidal guess

306. For L = $L_m$ down to 0 with step of -1
    308. Identify pixel location of point u in image $I^L$
    310. Calculate derivative of $I^L$ with respect to x
    312. Calculate derivative of $I^L$ with respect to y
    314. Calculate spatial gradient matrix G
    316. Initialization of iterative L-K optical flow computation
    318. for k = 1 to K with step of 1 (or until $|\eta^k|$ < accuracy threshold)
        320. Calculate image difference
        322. Calculate image mismatch vector
        324. Calculate optical flow using L-K optical flow computation
        326. Obtain the pixel displacement guess for next iteration
    328. end of for-loop on k
    330. Identify optical flow at Layer L
    332. Identify pyramidal guess for next Layer L-1
334.  end of for-loop on L
336.  Identify final optical flow vector
338.  Identify location of point on J Solution: The corresponding points is at location v on image J

FIG. 3

In Image I at Layer L: Pixel values corresponding to neighborhood of B are obtained from an external storage. 402

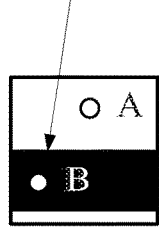

In Image I at Layer L: Pixel values corresponding to neighborhood of A are obtained after those of B from the external storage. 404

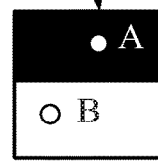

Image I

Pyramidal Layer L

Pyramidal Layer L

In Image I at Layer L: Pixel values corresponding to neighborhood of A are obtained earlier than those of B from an external storage because A is earlier in an order than B in image I. 502

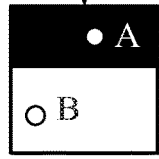

In Image I at Layer L: Pixel values corresponding to neighborhood of B are obtained later than those of A from the external storage because B is later in the order in image I. 504

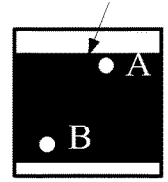

Image I

Pyramidal Layer L

Pyramidal Layer L

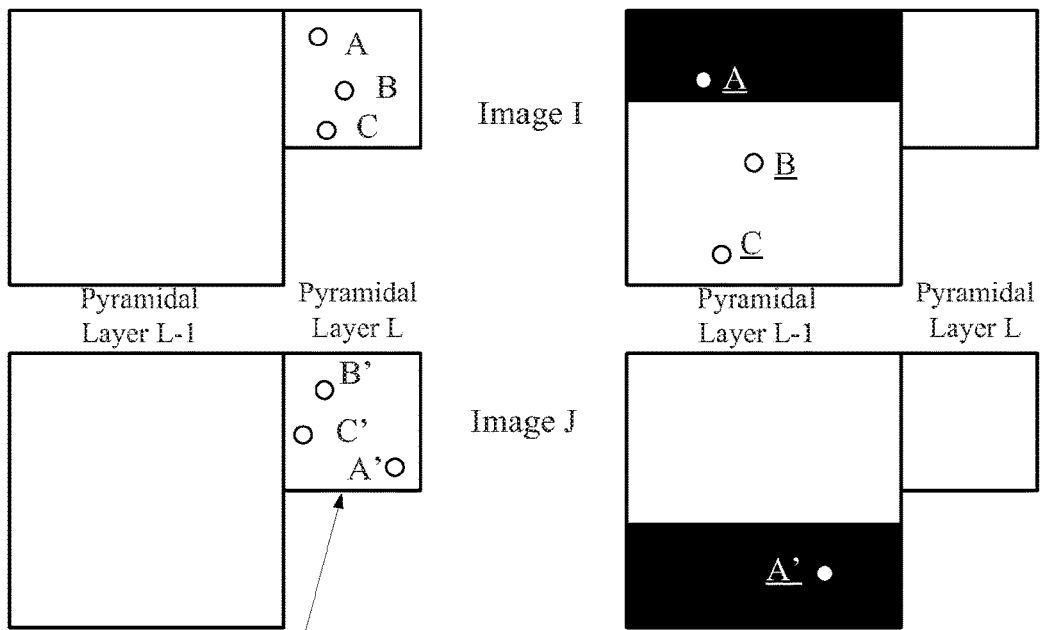
FIG. 6A
FIG. 6B
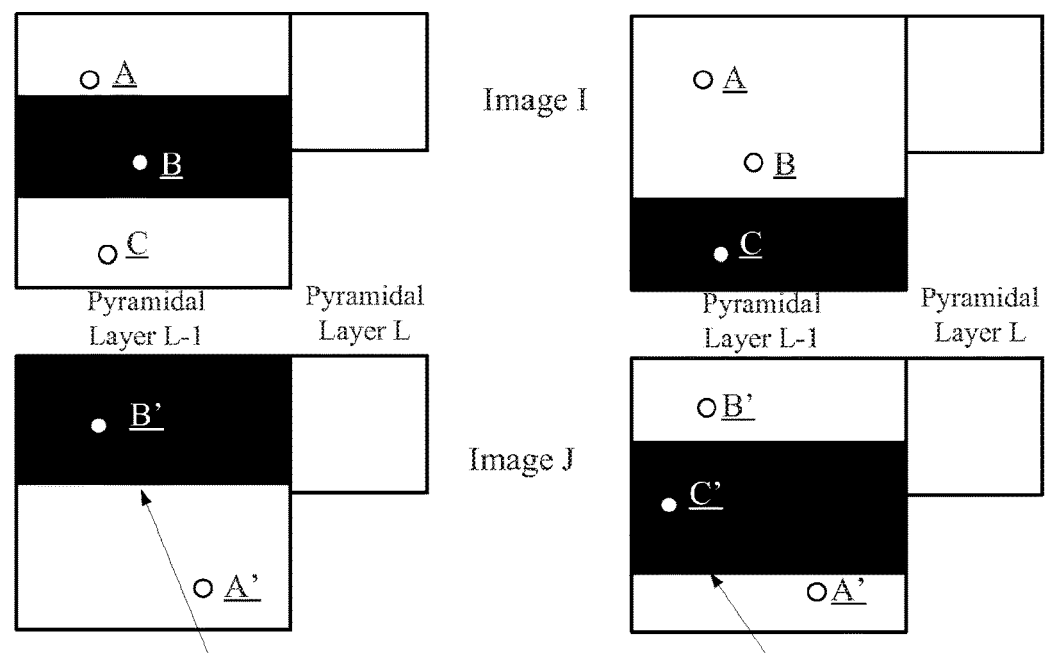
FIG. 6C
FIG. 6D

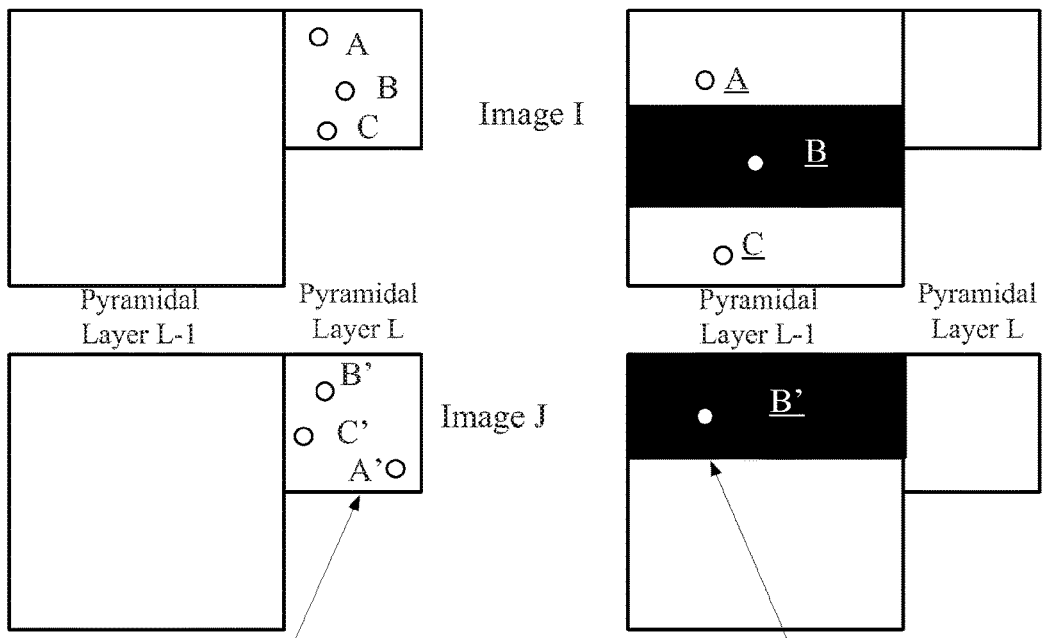
FIG. 7A
FIG. 7B
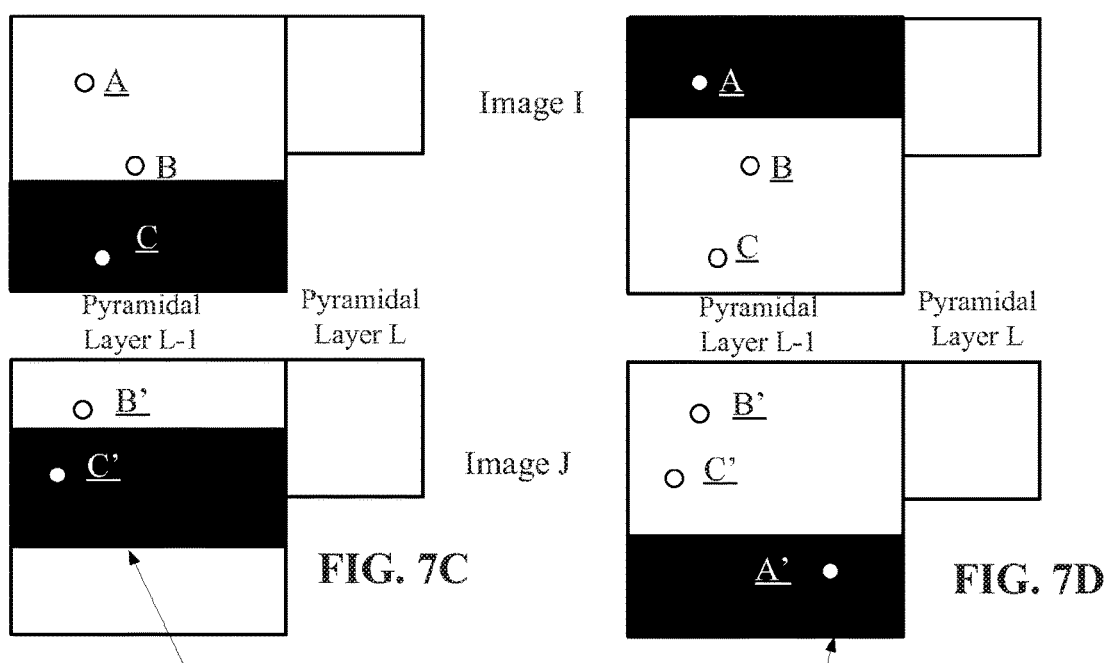
FIG. 7C
FIG. 7D

METHOD AND SYSTEM FOR FEATURE TRACKING USING IMAGE PYRAMIDS

CROSS-REFERENCE TO RELATED APPLICATIONS

This application is a National stage of International Application No. PCT/CN2017/072448, filed Jan. 24, 2017, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to data processing, including but not exclusively, to feature tracking using image pyramids.

BACKGROUND

Image feature tracking includes tracking one or more visual features through multiple images or video frames. For example, image feature tracking may find a best matching location in a second image for a feature point in a first image. To perform image feature tracking, image pyramid (also referred to as image pyramid representation) may be used.

Feature tracking using image pyramids is computation intensive, particularly when the tracking is for multiple feature points from one image to another.

SUMMARY

Described herein are systems, methods, storage media, and computer programs to track a plurality of feature points.

In one embodiment, a method for tracking a plurality of feature points is disclosed. In one embodiment, a first layer of a first image pyramid for a first image and a first layer of a second image pyramid for a second image are obtained. Both the first and second image pyramids have a plurality of layers and the first layer of the first image pyramid for the first image corresponds to the first layer of the second image pyramid for the second image. Based on expected pixel locations of the plurality of feature points in the first layer of the second image pyramid, a feature point is selected from the plurality of feature points. For the feature point, a first pixel is determined in the first layer of the first image pyramid and a second pixel is determined in the first layer of the second image pyramid, wherein the first pixel substantially matches the second pixel.

In one embodiment, an electronic device for tracking a plurality of feature points is disclosed. The electronic device includes a processor and a non-transitory machine readable storage medium that is coupled to the processor, the non-transitory machine readable storage medium containing instructions, which when executed by the processor, causes the electronic device to perform operations. The operations include obtaining a first layer of a first image pyramid for the first image and a first layer of a second image pyramid for the second image. Both the first and second image pyramids have a plurality of layers and the first layer of the first image pyramid for the first image corresponds to the first layer of the second image pyramid for the second image. The operations further include selecting a feature point from the plurality of feature points, based on expected pixel locations of the plurality of feature points in the first layer of the second image pyramid for the second image. The operations also include determining, for the feature point, a first pixel in the first layer of the first image pyramid for the first image and a second pixel in the first layer of the second image pyramid for the second image, where the first pixel substantially matches the second pixel.

In one embodiment, a non-transitory machine readable storage medium for tracking a plurality of feature points is disclosed. The non-transitory machine readable storage medium contains instructions, which when executed by a processor of an electronic device, cause the electronic device to perform operations. The operation includes storing a first layer of a first image pyramid for the first image and a first layer of a second image pyramid for the second image. Both the first and the second image pyramids have a plurality of layers and the first layer of the first image pyramid for the first image corresponds to the first layer of the second image pyramid for the second image. The operations further include selecting a feature point from the plurality of feature points, based on expected pixel locations of the plurality of feature points in the first layer of the second image pyramid for the second image. The operations further include determining, for the feature point, a first pixel in the first layer of the first image pyramid for the first image and a second pixel in the first layer of the second image pyramid for the second image, where the first pixel substantially matches the second pixel.

Embodiments of the present invention provide ways to select a feature point from a plurality of feature points to perform feature tracking using image pyramids so that the data retrieval for tracking the plurality of feature points are efficient.

BRIEF DESCRIPTION OF DRAWINGS

FIG. 3 illustrates pseudo code to track one feature point according to one embodiment of the invention.

FIGS. 4A-B illustrate obtaining pixel values for multiple feature points in a layer of the image pyramid for Image I.

FIGS. 5A-B illustrate obtaining pixel values for multiple feature points in a layer of Image I according to one embodiment of the invention.

FIGS. 6A-D illustrate obtaining pixel values for multiple feature points in layers of the image pyramids for Image I and Image J from an external storage to an internal storage according to one embodiment of the invention.

FIGS. 7A-D illustrate obtaining pixel values for multiple feature points in layers of the image pyramids for Image I and Image J from an external storage to an internal storage according to another embodiment of the invention.

DETAILED DESCRIPTION

Figure 1:
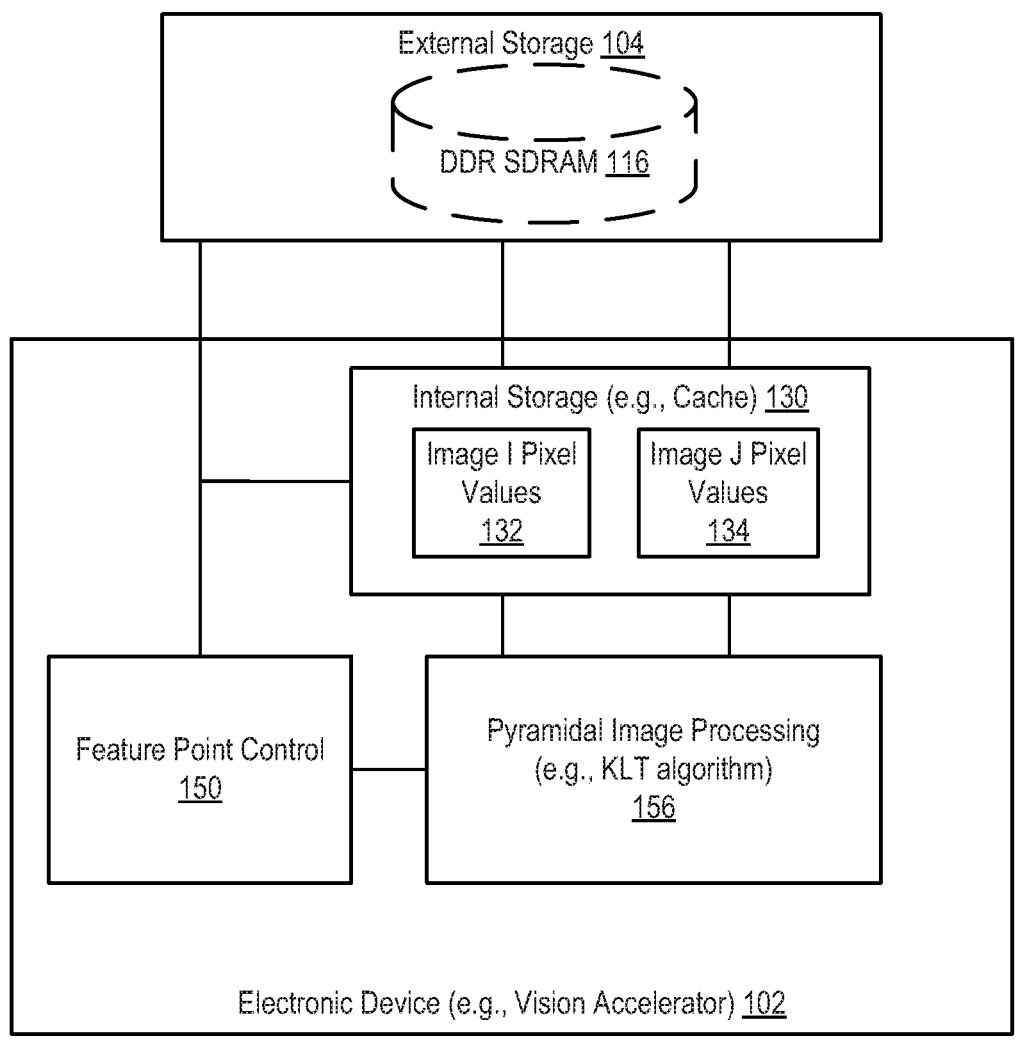
FIG. 1 illustrates a feature tracking system according to one embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

In figures, bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention. Also in the figures, reference numbers are used to refer to various elements or components, the same reference numbers in different figures indicate that the elements or components have the same or similar functionalities.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as computer or machine-readable storage media (e.g., magnetic disks, optical disks, read only memory (ROM), flash memory devices, phase change memory) and computer or machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more microprocessors coupled to one or more machine-readable storage media to store code for execution on the set of microprocessors and/or to store data. For instance, an electronic device may include non-volatile memory containing the code because the non-volatile memory can persist code/data even when the electronic device is turned off (when power is removed). When the electronic device is turned on that part of the code that is to be executed by the microprocessor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive and/or data using propagating signals) with other electronic devices.

A movable object is an electronic device that includes one or more propulsion units to propel the movable object. A movable object can be an unmanned aircraft, an unmanned vehicle, or a robot. Also, the movement of the movable object can be controlled through a different electronic device off-board from the movable object (e.g., a remote terminal of the movable object that is separated from the movable object). An unmanned aircraft is also referred to as an unmanned aerial vehicle (UAV), a drone, or an unmanned aircraft system (UAS), all of which are used interchangeably referring to the unmanned aircraft herein.

A computer vision system may be used to gain high-level understanding from digital images or videos. Through processing digital images or videos, a computer vision system may track positioning information of one or more features through a series of images or image frames. The task, often referred to as feature tracking, is often performed using image pyramids.

An image pyramid may be formed by repeated smoothing and/or subsampling of an image to form multiple layers of the image pyramid. An upper layer of an image pyramid thus has less resolution than a lower layer of the same image pyramid. To track the feature point from the first image to the second image, one may build a first image pyramid for the first image and a second image pyramid for the second image. The feature tracking results from an upper layer of the first and second image pyramids are used in the calculation of a lower layer. Through iterations in the multiple layers of the first and second image pyramids, the best matching location for the feature point in the second image is identified.

FIG. 1 illustrates a feature tracking system according to one embodiment of the invention. As shown in FIG. 1, the feature tracking system 100 includes an electronic device 102 and an external storage 104. The electronic device 102 includes an internal storage 130, a feature point control 150, and a pyramidal image processing unit 156. Each or some combination of one or more of the internal storage 130, the feature point control 150, and the pyramidal image processing unit 156 may be implemented in one or more electronic circuits. In one embodiment, the electronic device 102 may be implemented using a general-purpose processor. In an alternative embodiment, the electronic device 102 may be implemented using one or more of an application-specific integrated circuit (ASIC) and a field programmable gate array (FPGA). The electronic device 102 may be referred to as a vision/graphic accelerator or simply referred to as an accelerator.

The electronic device 102 is coupled to the external storage 104. The external storage 104 may store image pyramid data of multiple image pyramids for multiple images. The external storage 104 may be large enough to store all layers of image pyramid data of multiple image pyramids. For simplicity of discussion, description herein below focuses on feature tracking from a first image to a second image, where the first image is also referred to as Image I and the second image is also referred to as Image J. For feature tracking of a plurality of feature points of Image I in Image J, embodiments of the invention identify matching pixels of the plurality of feature points in Image J. The embodiments of the invention also apply to tracking scenarios other than feature tracking from Image I to Image J, for example, embodiments of the invention apply to feature tracking from a first image to a series of other images or from a video frame to one or more other video frames.

The external storage 104 may be coupled to (or otherwise in communication with) the internal storage 130, which may include a smaller storage for feature tracking than that of the external storage 104 and can store a portion of the image pyramid data from the external storage 104. In one embodiment, one or more layers of an image pyramid may be stored in the internal storage 130 directly once the image pyramid is formed, and the one or more layers is not stored in the external storage 104. The internal storage 130 may store image pyramid data for different image pyramids at different locations within the internal storage 130. For example, pixel values for Image I are stored at reference 132 while pixel values for Image J are stored at reference 134.

The external storage 104 and the internal storage 130 may include one or more of a variety of dynamic random-access memory (DRAM) such as double data rate synchronous DRAM (DDR SDRAM or referred to simply as DDR), single data rate (SDR) SDRAM, static RAM (SRAM), persistent mass storage device (e.g., Flash, magnetic disk), and persistent memory such as Phase Change Memory (PCM), Phase Change Memory and Switch (PCMS), Memristor, and spin-transfer torque (STT) RAM. In one embodiment, the external storage 104 includes a DDR SDRAM 116 to store the image pyramid data. In one embodiment, the internal storage 130 includes a cache to store image pyramid data (e.g., the portion of the image pyramid data obtained from the external storage 104 or one or more layers of an image pyramid once the image pyramid is formed). While the external storage 104 is illustrated to be outside of the electronic device 102, the external storage 104 may be implemented within the electronic device 102. For example, the electronic device 102 may be implemented as a system on a chip (SoC) system including the external storage 104.

A portion of the image pyramid data in the internal storage 130 may be provided to the pyramidal image processing unit 156. The pyramidal image processing unit 156 performs computations for layers of the image pyramids for the first and second images. In one embodiment, the pyramidal image processing unit 156 utilizes an implementation of Kanade-Lucas-Tomasi (KLT) algorithm. The computation of the pyramidal image processing unit 156 may be coordinated by the feature point control 150. For example, as discussed in more detail herein below, the feature point control 150 may determine the order of the plurality of feature points for computation of a lower layer based on computation results of an upper layer.

The determination by the feature point control 150 may be provided to the external storage 104 so that the external storage 104 provides proper image pyramid data to the internal storage 130 based on the determination. Alternatively or additionally, the determination of the feature point control 150 may be provided to the internal storage 130 so that the internal storage 130 may request and obtain the proper image pyramid data from the external storage 104 based on the determination. Through iterative computation of the image pyramid data of the first and second image pyramids, the feature tracking system 100 may obtain the matching points of the plurality of feature points of Image I in Image J.

Figure 2:
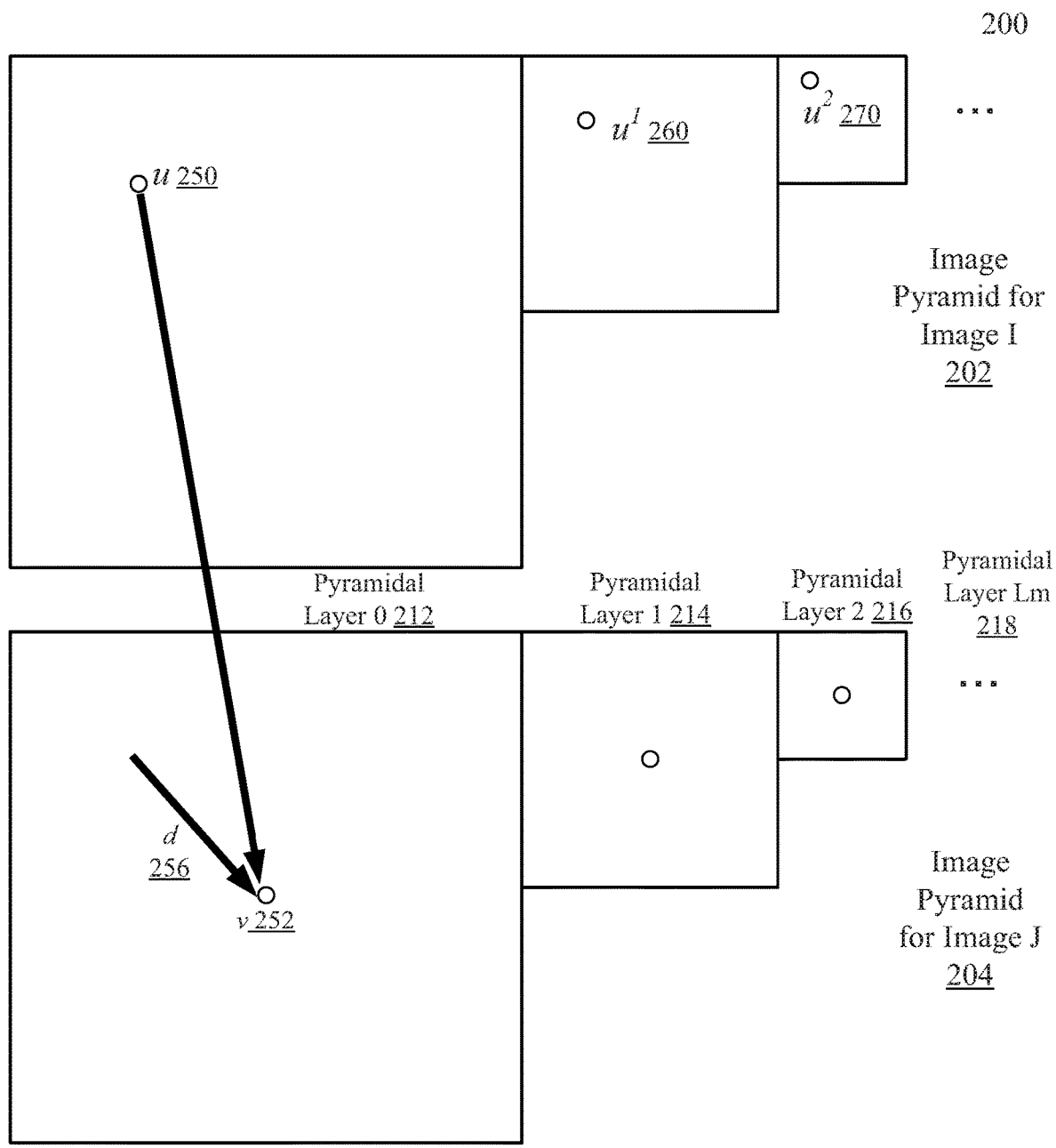
FIG. 2 illustrates the image pyramids for the first and second images according to one embodiment of the invention.

While FIG. 1 illustrates a feature tracking system, FIG. 2 illustrates the image pyramids for the first and second images according to one embodiment of the invention. As illustrated, an image pyramid 202 for Image I and an image pyramid 204 for Image J have the same number of layers, m+1, where m is an integer no less than zero.

The bottom layer of the image pyramids is a pyramidal layer 0 at reference 212. The pyramidal layer 0 represents the highest resolution of Image I and Image J. For example, the highest resolution of Image I and Image J may be the resolution of the raw images of Image I and Image J respectively. In one embodiment, the pyramid layer 0 of Image I and Image J includes pixel values of all or a portion of pixel locations of the raw images of Image I and Image J respectively. In one embodiment, the pixel values are grayscale values of Image I and Image J. In an alternative embodiment, the pixel values also include values of color intensity of the pixel locations. In one embodiment, the pixel values at one pixel location in Image I and Image J are represented as I(x, y) and J(x,y) respectively, where X and y are the two pixel coordinates of the pixel location.

For example, in the pyramidal layer 0, the upper left corner pixel coordinate vector may be represented as $[0\ 0]^T$, the width and height of Image I and Image J are the same and may be denoted as $n_x$ and $n_y$ (both are integers no less than one), and the lower right pixel coordinate vector is denoted as $[n_{x-1}\ n_{y-1}]^T$. It is to be noted that Image I and Image J do not need to have the same width and height for feature tracking to work, and the assumption is for simplicity of illustration.

For feature tracking, one may consider a feature point u at reference 250 in Image I. The feature point u may be represented as $[u_x\ u_y]^T$, where X and y are the two pixel coordinates of the feature point u. The goal of feature tracking is to find the location V at reference 252 in Image J, where $v=u+d=[u_x+d_x\ u_y+d_y]^T$ and J(v) matches (e.g., being the closest in its pixel value in Image J to) I(u). The vector $d=[u_x\ u_y]^T$ at reference 256 is referred to as the optical flow. An optical flow is also referred to as an optic flow or an image velocity, and it may indicate the apparent motion of a feature point from a first image to a second image. In this example, the optical flow d indicates the motion of the feature point u from Image I to V in Image J (hence the tracking of the feature point).

In one embodiment, the optimal flow d may be found by minimizing a residual function E as defined in the following:

$$\in(d)=\in(d_x,d_y)=\Sigma_{x=u_x-\omega_x}^{u_x+\omega_x}\Sigma_{y=u_y-\omega_y}^{u_y+\omega_y}(I(x,y)-J(x+d_x,y+d_y))^2 \quad (1)$$

In Equation (1), $\omega_x$ and $\omega_y$ are integers, thus the similarity between U and V can be measured in an image neighborhood with size $(2\omega_x+1)\times(2\omega_y+1)$. The image neighborhood may be referred to as an integration window. Typically values for $\omega_x$ and $\omega_y$ are within the range of 2 to 20.

To find the matching J(v) in Image J, the image pyramids for Image I and Image J can be built in a recursive fashion. The Layer 1 is computed from Layer 0, and Layer 2 is computed from Layer 1, and so on. The computation of an upper layer from an immediate lower layer may be through smoothing and/or subsampling in one embodiment. For example, let L=1, 2, . . . be a generic pyramidal layer, and let $I^{L-1}$ be the image I at the image layer L−1. Denote $n_x^{L-1}$ and $n_y^{L-1}$ to be the width and height of respectively. The image $I^L$ may then be defined using the following:

$$I^L(x,y) = \frac{1}{4}I^{L-1}(2x, 2y) + \frac{1}{8}(I^{L-1}(2x-1, 2y) + \quad (2)$$
$$I^{L-1}(2x+1, 2y) + I^{L-1}(2x, 2y-1) + I^{L-1}(2x, 2y+1)) +$$
$$\frac{1}{16}(I^{L-1}(2x-1, 2y-1) + I^{L-1}(2x+1, 2y+1) +$$
$$I^{L-1}(2x-1, 2y+1) + I^{L-1}(2x+1, 2y+1))$$

Through such smoothing and subsampling, the Layer L will contain approximately one-fourth of the pixel locations of the Layer L−1. For example, for an image I of size 1920×1024 (where $I^0$ has the same size), the image layers $I^1$, $I^2$, $I^3$ and $I^4$ are of respective sizes 960×512, 480×256, 240×128, and 120×64. Similarly, for an image J of size 1920×1024, the image layers $J^1$, $J^2$, $J^3$ and $J^4$ have the same respective sizes. Through the recursive process, the image pyramids for Image I and Image J are formed. An image pyramid may contain 2 to 10 layers. In FIG. 2, the image pyramids 202 and 204 have the same number of layers, including Layer 0 at reference 212, Layer 1 at reference 214, Layer 2 at reference 216, and the topmost layer $L_m$ at reference 218.

Based on the recursive method through which an image pyramid for an image is built, one may identify the pixel locations of a feature point at different layers. For example, based on Equation (2), one may identify $u^1$ 260 that is at layer 1, and then identify $u^2$ 270 that is at layer 2 until the pixel locations of the feature point at all layers are identified.

It is to be noted that Equation (2) illustrates one recursive method to build an image pyramid for an image, and other ways with different smoothing and/or subsampling methods may be implemented to build an image pyramid for an image too. For example, a Gaussian pyramid, a Laplacian pyramid, or a steerable pyramid may be built for an image. Embodiments of the invention is not limited to any standard or proprietary way to build the image pyramids for Image I and/or Image J.

Once the image pyramids for Image I and Image J are formed, feature tracking may be performed. For example, the feature tracking may start from the topmost layer of the image pyramids for Image I and Image J, and the results of the topmost layer, including the optical flow information, is provided to the one layer below to track the feature at that layer. The recursive process continues until the value of the optical flow $d=[d_x\ d_y]^T$ at Layer 0 is derived thus the feature point is identified in Image J as v=u+d as illustrated in FIG. 2.

FIG. 3 illustrates pseudo code to track one feature point according to one embodiment of the invention. The purpose of the pseudo code 300 is to find, for a single point u in Image I, a corresponding location v in Image J.

At reference 302, image pyramids for Image I and Image J are built. The Image pyramids for Image I and Image J may be built using the methods discussed herein above relating to FIG. 2. The pyramids may be represented by: $\{I^L\}_{L=0,\ldots L_m}$ and $\{J^L\}_{L=0,\ldots L_m}$.

At reference 304, a guess for the optical flow at the topmost level $L_m$, referred to as a pyramidal guess at $L_m$, is initialized to be the following:

$$g^{L_m}=[g_x^{L_m} g_y^{L_m}]^T=[0\ 0]^T \tag{3}$$

The initialized pyramidal guess is then updated at layers of the pyramids as discussed herein below.

At reference 306, an outer computation loop starts. The outer loop starts with the topmost layer, Layer $L_m$, and goes one layer lower at each iteration until reaching the bottom layer, Layer 0. Within each iteration of the outer loop, the pixel location of point u in Image $I^L$ can be identified at reference 308. The Image $I^L$ is the layer L of the image pyramid for Image I, and the location of point u in Image $I^L$ may be identified through the methods discussed relating to FIG. 2. In one embodiment, the pixel location of point u in Image $I^L$ is identified using the following, where $u^0=u$:

$$u^L=[p_x p_y]^T=u/2^L \tag{4}$$

Then at references 310 and 312, the derivatives of $I^L$ with respect to X and y are calculated respectively. In one embodiment, the derivatives with respect to X and y are calculated using the following:

$$I_x(x,y) = \frac{I^L(x+1,y) - I^L(x-1,y)}{2} \tag{5}$$

$$I_y(x,y) = \frac{I^L(x,y+1) - I^L(x,y-1)}{2} \tag{6}$$

The derivatives of $I^L$ with respect to X and y are then used to calculate a spatial gradient matrix G at reference 314. In one embodiment, the spatial gradient matrix G may be obtained for an integration window using the following:

$$G = \sum_{x=p_x-\omega_x}^{p_x+\omega_x} \sum_{y=p_y-\omega_y}^{p_y+\omega_y} \begin{bmatrix} I_x^2(x,y) & I_x(x,y)I_y(x,y) \\ I_x(x,y)I_y(x,y) & I_y^2(x,y) \end{bmatrix} \tag{7}$$

It is to be noted that the spatial gradient matrix G is obtained using pixel values of Layer L for Image I within the integration window of size $(2\omega_x+1)\times(2\omega_y+1)$, and the spatial gradient matrix G for a given Layer L thus needs to be calculated only once for the given Layer L.

For the given Layer L, an iterative Lucas-Kanade optical flow computation may be performed through an inner loop. Prior to starting the computation of the inner loop, the initial pixel displacement guess may be initialized using the following:

$$\bar{v}^0=[0\ 0]^T \tag{8}$$

Then the inner loop computation may be performed starting at reference 318 to obtain the optical flow for point u at Layer L and the pyramidal guess for Layer L−1. The inner loop may be performed a predetermined number (K) of times or until a computed optical flow $\bar{\eta}^k$ is small enough, whichever condition is reached first. For example, the predetermined number K may be a value within the range of 3 to 30, and the optical flow condition is that the absolute value of the computed optical flow $\bar{\eta}^k$ is less than a predetermined accuracy threshold. For example, the predetermined optical flow threshold may be a value within the range of 0.01 and 1 pixel. The inner loop computation conditions are represented at reference 318.

At reference 320, an image difference at a given k within [1, K] is calculated. In one embodiment, the image difference for a given k is calculated using the following:

$$\delta I_k(x,y) = I^L(x,y) - J^L(x+g_x^L+v_x^{k-1}, y+g_y^L+v_y^{k-1}) \tag{9}$$

Based on the image difference, an image mismatch vector may be calculated. In one embodiment, the image mismatch vector for the given k is calculated using the following:

$$\bar{b}_k = \sum_{x=p_x-\omega_x}^{p_x+\omega_x} \sum_{y=p_y-\omega_y}^{p_y+\omega_y} \begin{bmatrix} \delta I_k(x,y)\ I_x(x,y) \\ \delta I_k(x,y)\ I_y(x,y) \end{bmatrix} \tag{10}$$

Based on the spatial gradient matrix G at reference 314 and the image mismatch vector $\bar{b}_k$ at reference 322, the optical flow $\bar{\eta}^k$ may be calculated using Lucas-Kanade optical flow computation. In one embodiment, the calculation uses the following for the given k:

$$\overline{\eta}^k = G^{-1}\overline{b}_k \quad (11)$$

Additionally, at reference 326, the pixel displacement guess may be obtained using the optical flow $\overline{\eta}^k$ for the next iteration, k+1. In one embodiment, the pixel displacement guess for k is calculated using the following:

$$\overline{v}^k = \overline{v}^{k-1} + \overline{\eta}^k \quad (12)$$

When the pixel displacement guess for the next iteration is obtained, the inner loop for the k is completed for point u at Layer L at reference 328. Unless the inner loop condition is satisfied at reference 318, the operation goes to the next iteration, and the operations in references 320-326 are repeated for the next iteration. As illustrated in Equation (9), the pixel displacement guess obtained for the present k is used for the next iteration, k+1.

Once the inner loop condition is satisfied, operations continue at reference 330, where the optical flow at Layer L is identified. In one embodiment, the optical flow at Layer L is identified using the following:

$$d^L = \overline{v}^K \quad (13)$$

It is to be noted that if the accuracy threshold is reached prior to k=K, a different $\overline{v}^k$ is used to derive $d^L$.

Additionally, at reference 332, a pyramidal guess for Layer L−1, which is the immediate lower layer of layer L, is obtained. In one embodiment, the pyramid guess for Layer L−1 is obtained using the following:

$$g^{L-1} = [g_x^{L-1} g_y^{L-1}]^T = 2(g^L + d^L) \quad (14)$$

The outer loop for Layer L is completed at reference 334. Unless the outer loop condition is satisfied at reference 306, the operations continue to the next immediate lower layer, and the operations in references 308 to 334 are repeated for the next iteration. As illustrated in Equation (9), the pyramid guess for the immediate lower layer of layer L may be applied for the computation of the image difference at the immediate lower layer.

Once the outer loop condition is satisfied at reference 306, which means that the computation is done at the bottom layer, Layer 0. Then the final optical flow vector d at Layer 0 for Image J is obtained based on the pyramidal guess for Layer 0 and the optical flow at Layer 0 at reference 336. The final optical flow vector may be calculated using the following:

$$d = g^0 + d^0 \quad (15)$$

Then the pixel location of matching point v in Image J of the feature point u in Image I may be identified based on the final optical flow at reference 338. The pixel location of the matching point u may be identified using the following:

$$v = u + d \quad (16)$$

Thus, through the operations at references 302 to 338, the matching point v in Image J of the feature point u in Image I may be identified. It is to be noted that the equations and the pseudo code 300 discussed herein above are for illustration only. Other pseudo codes and their associated equations may be utilized to track a feature point too. For example, while the optical flow and pixel displacement guess are computed in the inner loop in pseudo code 300, other one or more offset values may be computed for one layer (e.g., Layer L) to aid the compute to a lower layer (e.g., Layer L−1) using a different algorithm. Embodiments of the invention are not limited to any implementation of pseudo code and/or equations for feature tracking using image pyramids.

A method (such as the ones discussed herein above relating to FIG. 3) to track a feature point may be implemented in a system such as the feature tracking system 100. Referring to FIG. 1, the image pyramids for Image I and Image J may be stored in the external storage 104. In one embodiment, the image pyramids for Image I and Image J may be stored in the DDR SDRAM 116 within the external storage 104. The pixel values for Image I and Image J at various layers of the image pyramids may take a sizeable storage space. Since the internal storage 130 has less storage space than the external storage 104, the pixel values at various layers may not be able to be stored within the internal storage 130 simultaneously. Due to the limitation, the internal storage 130 may only obtain pixel values for various locations at layers of the image pyramids when the electronic device 102 requires the pixel values during its computation for feature tracking.

While FIG. 3 and related discussion focus on feature tracking of one feature point, typically feature tracking involves tracking multiple feature points. The multiple feature points may be selected from Image I based on a certain criterion. For example, if the minimum eigenvalues of a spatial gradient matrix (e.g., G in Equation (7)) of points in an image are over a threshold value, these points may be selected. These points with this characteristic are considered to be easier to track than the other points of Image I. The elected easy-to-track points may be further filtered through identifying feature points that are the local maximum points in a neighborhood of Image I (e.g., within a neighborhood of N×N pixels where N is an integer within the range of 3 to 10) with regards to the eigenvalues of the spatial gradient matrix.

While different ways may be used to select multiple feature points, embodiments of the invention are not limited to the way the multiple feature points are selected. Instead, once multiple feature points are selected from an image, embodiments of the invention address issues of finding efficient ways to tracking the multiple feature points of the image.

When a system such as the feature tracking system 100 tracks multiple feature points, the image pyramids for Image I and Image J may be formed. All layers of the image pyramids may be stored in the external storage 104, or one or more layers (e.g., upper layers, which have fewer pixel values) may be stored in the internal storage 130 and the rest may be stored in the external storage 104. Then the feature tracking may be performed one layer at a time from the topmost layer to the lower layers. Note that in this Specification, lower layers refer to one or more layers that are lower than the topmost layer of an image pyramid. As the internal storage 130 has less storage space than the external storage 104, the internal storage 130 may obtain one or more layers of the image pyramids (instead of all the layers of the image pyramids) for the feature tracking system 100 to perform the tracking tasks.

FIGS. 4A-B illustrate obtaining pixel values for multiple feature points in a layer of the image pyramid for Image I. Two feature points, A and B, are to be tracked through a system such as the feature tracking system 100 from Image I to Image J. As discussed, feature tracking using image pyramids may start from the topmost layer of the image pyramids, and the layer L in FIGS. 4A-B may be the topmost layer or one of the lower layers of the image pyramid for Image I.

The order of pixel values to be retrieved from the external storage is based on how feature points are tracked using image pyramids. Assuming that the feature tracking does not follow a particular order, the feature point B may be tracked earlier than the feature point A. To track the feature point B, pixel values corresponding to the neighborhood of the feature point B are obtained from an external storage at reference 402. For example, the pixel values may be obtained from the external storage 104 to the internal storage 130. The obtained pixel values may then be used for the computation to identify an expected pixel location of the feature point B in the layer (e.g., the topmost layer, Layer $L_m$) of the second image pyramid for Image J.

It is to be noted that pixel values of consecutive pixels can be obtained from the external storage as illustrated with the black stripe around the feature point B. The pixel values of pixels around the location of the feature point B in the layer of Image I are obtained from the external storage, as these pixel values may be used to calculate the derivatives and spatial gradient matrix as discussed herein above relating to FIG. 3 and Equations (5) to (7) and other later computation/operations as discussed. The pixel values in the layer for Image J are obtained from the external storage as needed (not shown).

After the computation for the feature point B is completed, at reference 404, pixel values corresponding to the neighborhood of the feature point A are obtained from the external storage to track the feature point A. Since pixel values in later locations in Layer L for Image I are obtained earlier than those of earlier locations, the retrievals of the pixel values do not follow the order of the pixel values being stored in the external storage for Image I in this approach.

Additionally, for Image J, as one may observe from the inner loop 318 to 328, the location of the required pixel value for Image J changes with each iteration, e.g., Equation (9) illustrates the value of $J^L()$ changes based on the values of $v_x^{k-1}$ and $v_y^{k-1}$. As the internal storage retrieves the required pixel values for Image J as needed, the retrievals of the pixel values for Image J do not follow the order of the pixel values being stored in the external storage for Image J. Thus, following this approach, the retrievals for neither Image I nor Image J follow the order the pixel values being stored in the external storage.

Such ad-hoc data retrievals for Images I and/or J from the external storage are often inefficient. The pixel values of an image are typically stored in the external storage in a pre-determined order, and retrievals without consideration of the order is less efficient. For example, the ad-hoc retrievals from the internal storage may be considered random by the external storage, as pixel values at different locations are retrieved following each other. Such retrievals take a longer time for the internal storage to obtain the pixel values. For feature tracking of a feature point using image pyramids, the time taken for retrievals often counts for a significant portion of the total time to identify the feature point in Image J. For example, the retrieval time may reach 50~75% of the total time for feature tracking. Reducing the retrieval time may significantly improve the total time that takes for feature tracking. Additionally, the ad-hoc data retrievals may take a large percentage of bandwidth of the communication interface between the external storage and the internal storage. Thus, the ad-hoc data retrievals should be avoided.

One way to reduce retrieval time and/or bandwidth consumption of the data retrievals for feature tracking thus improve the overall feature tracking efficiency is to consider the order of multiple features points when performing feature tracking. Regarding the order to store the pixel values of an image or a layer of an image pyramid for the image in the external storage, it is to be noted that there are different pre-determined orders.

For example, the pixel values may be stored according to a raster scanning order (sometimes referred to as raster order) of the pixels in an image. According to the raster scanning order, the pixel values of an image may be stored where the pixel value at the top left corner of the image is stored first, followed by other pixel values for the first row from left to right of the image, followed by the pixel values at the second and later rows from left to right of the image, until the pixel value at the bottom right of the image is stored last. Alternatively, the pixel values may be stored according to a zig-zag order of the pixels in the image. According to the zig-zag order, the pixel values of an image may be stored where the pixel value at the top left corner of the image is also stored first, followed by the pixel values at the next pixel locations closest to the top left corner of the image (e.g., the first pixel location in the second row and the second pixel location in the first row), and followed by the pixel values at the pixel locations further away from the top left corner of the image, until the pixel value at the bottom right of the image is stored last.

The discussion herein below focuses on the pixel values of the image pyramids being stored in a raster scanning order in an external storage such as the external storage 104. However, it is to be understood that embodiments of the invention may be applied to the pixel values of the image pyramids that are stored in a zig-zag order or another order.

One way to improve the retrieval efficiency from the external storage to the internal storage is to cause feature tracking computation to be aligned with the way that the pixel values are stored in the external storage. When multiple feature points are arranged for feature tracking in consideration of the way that the pixel values are stored in the external storage, the retrieval efficiency improves.

FIGS. 5A-B illustrate obtaining pixel values for multiple feature points in a layer of Image I according to one embodiment of the invention. In FIGS. 5A-B, two feature points A and B are to be tracked from Image I to Image J. At reference 502, the pixel values corresponding to the neighborhood of the feature point A are obtained from an external storage earlier than those of the feature point B, because the feature point A is earlier in an order than the feature point B in Image I. The pixel values of consecutive pixel locations are obtained from the external storage as illustrated with the black stripe around the feature point A. The obtained pixel values are used for the computation/operations for feature tracking of the feature point A as discussed herein above relating to FIG. 3.

At reference 504, the pixel values corresponding to the neighborhood of the feature point B are obtained second from an external storage, because the feature point B is later in the order than the feature point A in Image I. The pixel values of consecutive pixel locations are obtained from the external storage as illustrated with the black stripe around the feature point B, similar to FIG. 5A. The tracking order of feature points A and B may follow a raster scanning order or a zig-zag order of the feature points A and B in image I. When the pixel values are stored according to a raster scanning order, the order of feature points A and B in tracking follows the raster scanning order; and when the pixel values are stored according to a zig-zag order, the order of feature points A and B in tracking follows the zig-zag order. Thus, because the feature point A is earlier than the feature point B in a raster scanning order (or a zig-zag order) in Image I, the feature point A is tracked earlier the feature point B.

It is to be noted that the black stripe moves downward from FIGS. 5A to 5B, and that illustrates the pixel values stored in the internal storage are changing, and the pixel values retrieved for the feature point A may be removed to make space for the pixel values for the feature point B. In one embodiment, for feature tracking of one feature point, the internal storage needs to be able to store at least a number of rows (e.g., the number being 2 N+ the height of integration window, where N is the maximum magnitude value of the optical flow vector, and the height of the integration window may be a value in the range of 5 to 41). In other words, the internal storage may have a limited storage space but still can be used to complete feature tracking for both feature points A and B.

When the topmost layers of Image I and Image J are stored in the external storage, embodiments of the invention as illustrated in FIGS. 5A-B may be applied to the topmost layer of Image I and Image J. Since the multiple feature points are ordered based on their locations in Image I, the corresponding pixel value retrievals for feature tracking determination may be performed sequentially for the topmost layer for Image I from the external storage. That is, the internal storage may obtain the pixel values in the topmost layer for Image I sequentially in their location orders from the external storage. The pixel locations of the multiple feature points at the topmost layer for Image I are known once the image pyramids are formed, thus feature tracking at the topmost layer may be performed based on the pixel locations of the multiple feature points at the topmost layer for Image I. When the topmost layers of Image I and Image J are stored in the internal storage (e.g., one or more other upper layers, including the topmost layers, may be stored in the internal storage when the image pyramids are formed), the pixel values of the topmost layers of Image I and Image J are no longer retrieved from the external storage, and embodiments illustrated in FIGS. 5A-B do not apply.

Once the feature tracking for the multiple feature points at one layer (e.g., Layer L) is completed, the feature tracking continues at the lower layers (e.g., Layer L−1 and below). FIGS. 6A-D illustrate obtaining pixel values for multiple feature points in layers of the image pyramids for Image I and Image J from an external storage (e.g., the external storage 104) to an internal storage (e.g., the internal storage 130) according to one embodiment of the invention. In this example, Layer L may be the topmost layer or one of the lower layers and three feature points A-C are tracked in Image I and Image J.

In FIG. 6A at reference 602, the feature tracking computation at Layer L is completed, and the pixel locations of the feature points A to C in Layer L for Image I are in an order different from the same feature points, expressed as A' to C', in Layer L Image J. The difference in pixel locations of the same feature points between Image I and Image J is common for feature tracking as the feature points likely do not stay in the same locations across the two images.

One may perform feature tracking at any suitable order, e.g., performing feature tracking in any of the orders of A-B-C, A-C-B, B-A-C, B-C-A, C-A-B, and C-B-A. As discussed herein above relating to FIG. 4A-B, ad-hoc data retrievals without considering the order of the pixel values being stored in the external storage are often inefficient. Thus in one embodiment, the feature tracking may be performed according to the order of A-B-C, which corresponds to the location order of feature points A to C in Layer L for Image I. The order of feature points A-B-C may follow a raster scanning order or a zig-zag order of the feature points A, B, and C in image I. When the pixel values are stored according to a raster scanning order, the order of feature points A, B, and C in tracking follows the raster scanning order; and when the pixel values are stored according to a zig-zag order, the order of feature points A, B, C in tracking follows the zig-zag order.

In FIG. 6B, after completing computation at Layer L, the feature tracking computation moves on to the immediately lower layer of Layer L, Layer L−1. The locations of the feature points A-C in Layer L−1 for Image I may be determined based on the locations of these features in Layer L for Image I. The determination of a location of a feature point in Image I from an upper layer to a lower layer is discussed herein above relating to FIG. 2 and Equation (2). The feature points A, B, and C illustrate the locations of these feature points in Layer L−1 for Image I and the feature points A', B', and C' illustrate the expected locations of these feature points in Layer L−1 for Image J.

Following the feature tracking order of A-B-C, the feature point A is tracked at FIG. 6B. The pixel values corresponding to the neighborhood of the feature point $\underline{A}$ at Layer L−1 for Image I are obtained earlier than those of the feature points $\underline{B}$ and $\underline{C}$ from the external storage. At reference 604, the pixel values corresponding to the neighborhood of the expected $\underline{A}'$ at Layer L−1 for Image J are obtained from the external storage.

It is to be noted that the obtained pixel values at Image J corresponds to the end of Image J at Layer L−1 because the feature point $\underline{A}'$ is expected to be in the area. Prior to computation at Layer L−1, the expected location of the feature point $\underline{A}'$ in Image J is unknown, thus, the retrieval of the pixel values for the feature point $\underline{A}'$ needs to wait until an initial location is determined, e.g., through the first iteration of the inner loop at reference 320, where the image difference may be calculated through Equation (9).

Once the inner loop is completed for the feature point A, using the pixel values retrieved from Layer L−1 for both Image I and Image J, one or more offset values (e.g., the optical flow and/or pixel displacement guess) of the feature point A for Layer L−1 is determined, and the computation for the feature point A is done.

In FIG. 6C, the pixel values corresponding to the neighborhood of the feature point $\underline{B}$ at Layer L−1 for Image I are obtained from the external storage. Additionally, the pixel values at Layer L−1 corresponding to neighborhood of $\underline{B}'$ are obtained from the external storage at reference 606. Similarly in FIG. 6D, the pixel values corresponding to the neighborhood of the feature point $\underline{C}$ at Layer L−1 for Image I are obtained from the external storage, and the pixel values at Layer L−1 corresponding to neighborhood of $\underline{C}'$ are obtained from the external storage at reference 608.

FIGS. 6B-D illustrate that the tracking of the feature points and corresponding data retrievals for the tracking follow the location order of the feature points of Layer L for Image I. For Image I, tracking the feature points following the A-B-C order is efficient as the pixel values are obtained sequentially from the external storage following the pixel location orders. Note the black stripes in Layer L−1 for Image I in FIGS. 6B-6D for $\underline{A}$, $\underline{B}$, and $\underline{C}$ follow one after another in the areas they cover, and that is meant to show that the pixel values in Layer L−1 for Image I can be retrieved sequentially from the external storage, obtaining the pixel values of consecutive pixel locations stored for Image I in the external storage.

However, feature tracking according to the pixel location in Image I as illustrated in FIGS. 6B-D causes out-of-order retrievals for Image J. As illustrated, In Layer L for Image J, the feature points are ordered as B'-C'-A' according to their pixel locations. In FIG. 6B, the pixel values at Image J corresponding to the end of Image J at Layer L−1 are obtained for feature point A, ahead of the pixel values for the feature points B and C. Since the retrievals of the pixel values at Image J does not follow the sequential storage order of B'-C'-A', the retrieval for Image J may be inefficient.

Additionally, as discussed herein above relating to FIG. 3 reference 320 and Equation (9), the location of the required pixel value for Image J changes with each iteration of the inner loop of the feature tracking method, e.g., Equation (9) illustrates the value of $J^L(\ )$ changes based on the values of $v_x^{k-1}$ and $v_y^{k-1}$, which changes based on the value of k in each iteration of the inner loop for one layer. In contrast, the values in Image I often are not involved in multiple iterations of computation in the inner loop for the layer. For example, the calculation of the derivatives of $I^L$ with respect to X and y and the calculation of the spatial gradient matrix G are performed outside of the inner loop, thus requires no additional retrievals from the external storage for the computation within the inner loop. Therefore, computation with regards to Image J is often more intensive than that of Image I for feature tracking.

Thus, while the embodiments discussed in FIGS. 6A-D may be more efficient than tracking based on an arbitrary (e.g., a random) order of feature points, since the pixel values in Image J are involved in more intensive computation than those in Image I, the embodiments may not be the optimal solution.

When performing feature tracking in the topmost layer, tracking based on pixel locations of feature points in Image J is not feasible since the pixel locations of feature points in Image J is unknown (e.g., the pyramidal guess is in initialized state at reference 304 prior to the completion of the first iteration of the outer loop in FIG. 3). Thus, the embodiments illustrated in FIGS. 5A-5B is a good solution for the topmost layer. For a layer (say Layer L−1) lower than the topmost layer, its immediate upper layer (Layer L) has computed the pixel locations of the multiple feature points in that immediate upper layer for Image J. The information about that layer (Layer L) may be used to determine the order of feature points in feature tracking in the present layer (Layer L−1). That is, the known locations of A', B', C' in Layer L for Image J may be used to select the feature tracking order of the multiple points in Layer L−1.

FIGS. 7A-D illustrate obtaining pixel values for multiple feature points in layers of the image pyramids for Image I and Image J from an external storage to an internal storage according to another embodiment of the invention. The feature tracking in FIGS. 7A-D is based on the expected pixel locations of the feature points in Layer L−1 of Image J.

The expected pixel location of the feature points in Layer L−1 of Image J is obtained based on the computation results in Layer L. As illustrated in FIG. 7A, the computation in Layer L determines that the pixel locations of the feature points in Image J are in the sequential order of B'-C'-A'. Thus, that order may be used to track the multiple features, and in one embodiment, the feature point B is tracked first, followed by the feature point C, and followed by the feature point A. The order of feature points B'-C'-A' may follow a raster scanning order or a zig-zag order of the feature points B', C', and A' in image J.

The embodiments illustrated in FIGS. 7A-D are optimized for the computation of Image J. The black stripes in Layer L−1 for Image J in FIGS. 7B-D for B', C', and A' follow one after another in the areas they cover, and that is meant to show that the pixel values in Layer L−1 for Image J can be retrieved sequentially from the external storage, where the pixel values of consecutive pixel locations stored for Image J are obtained from the external storage. However, one compromise of the approach is that the pixel value retrievals for Image I no longer follow the sequential order in which the pixel values are stored in the external storage. Thus, the embodiments illustrated in FIGS. 7B-D may not be optimal for Image I. It is to be noted that for feature tracking such as the ones discussed herein above relating to FIG. 3, the data (e.g., pixel values) for Image J are accessed (e.g., retrieving) more frequently from the external storage than the data for Image I. Aiming at optimizing accessing data for Image J (e.g., embodiments illustrated in FIGS. 7A-D), while may come at the expense of lesser optimization in accessing data for Image I, may result in more efficient feature tracking (e.g., fast time and/or lower bandwidth consumption to track the feature points) overall than that of FIGS. 6A-D.

The embodiments of the invention illustrated in FIGS. 5A-B may be implemented at the topmost layer of the image pyramids, and alternative embodiments of the invention illustrated in FIGS. 6A-D and 7A-D may be implemented at the lower layers of the image pyramids. An embodiment of the invention may choose to implement only the operations relating to FIGS. 5A-B without implementing the operations relating to FIGS. 6A-D or 7A-D. Another embodiment of the invention may choose to implement only the operations relating to FIGS. 6A-D or 7A-D without implementing the operations relating to FIGS. 5A-B. Yet another embodiment of the invention may choose to implement the operations discussed relating to FIGS. 5A-B and one of the implementations of FIGS. 6A-D and 7A-D.

It is to be noted that feature tracking that takes into account the order of multiple feature points in Images does not preclude parallel tracking of feature points. Tracking of the multiple feature points may be performed simultaneously in one or more layers and for some or all of the multiple features. The parallel tracking does not prevent ordering of the multiple feature points as the order allows the tracking to be prioritized among the multiple feature points (e.g., when a system is overloaded, the earlier ordered feature points are tracked prior to the later ordered ones when the feature points would be tracked in parallel otherwise). The ordering allows the pixel values to be retrieved into the internal storage following the order of the pixel values being stored for Image I or Image J thus offers better retrieval time and/or less bandwidth consumption as discussed herein above.

Figure 8:
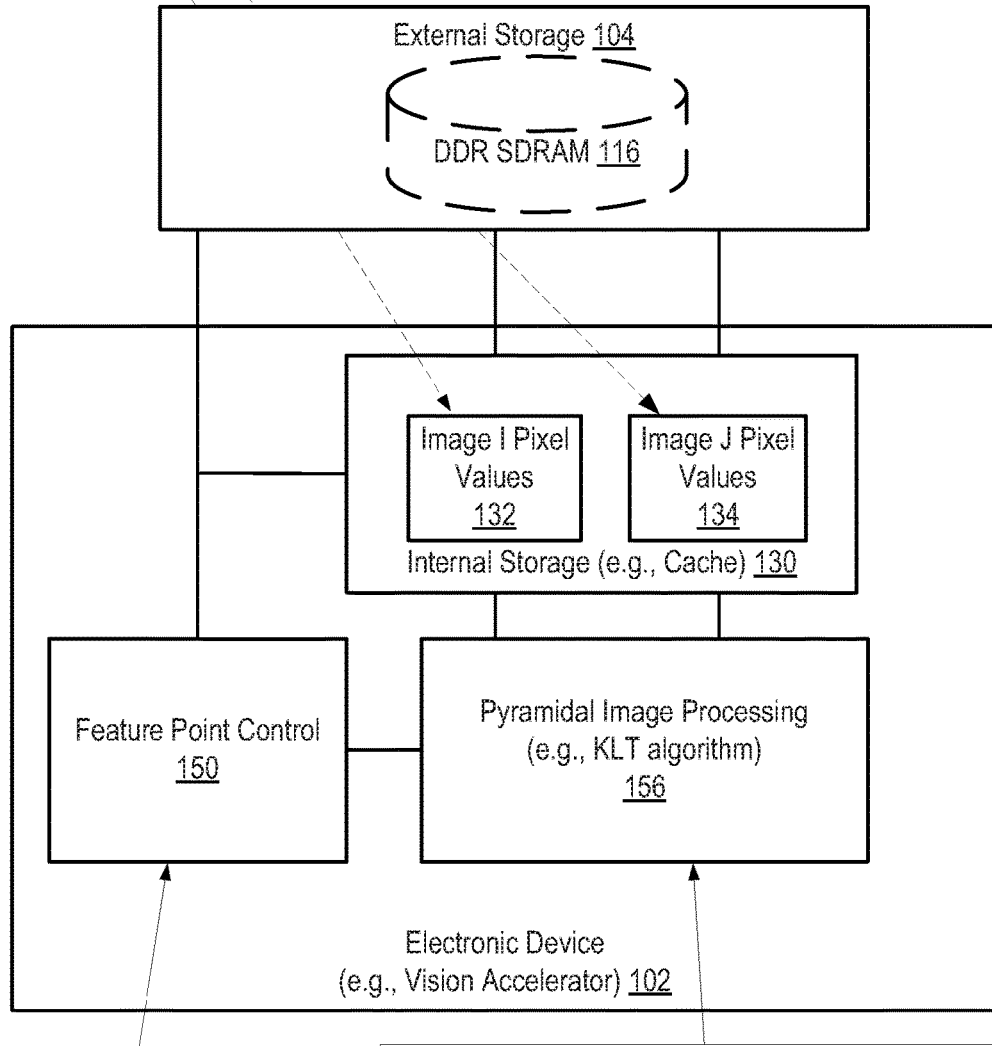
FIG. 8 illustrates operations of tracking multiple feature points at one layer of the image pyramids according to one embodiment of the invention.

FIG. 8 illustrates operations of tracking multiple feature points at one layer of image pyramids according to one embodiment of the invention. Task boxes 1 to 3 illustrate the order in which operations are performed according to one embodiment of the invention.

At task box 1, the internal storage 130 retrieves pixel values of the layer for Image I and Image J from the external storage 104 for tracking multiple feature points at the layer. The retrieved pixel values for Image I and Image J may be stored in different locations in the internal storage 130. The amount of the pixel values retrieved depends on the computation performed in the pyramidal image processing unit 156 for the layer. In one embodiment, the layer is the topmost layer.

In one embodiment, the pixel values of the layer for Image I and Image J are stored within the internal storage 130 prior to the starting of tracking the multiple feature points. For example, instead of storing all layers of the image pyramids of Image I and Image J in the external storage 104, one or more upper layers including the topmost layer may be stored in the internal storage 130. Thus, the electronic device 102 no longer retrieves the pixel values from the external storage 104 for the determination in task box 2 for the one or more top layers. In that embodiment, the operations at task box 1 are skipped.

At task box 2, the pyramidal image processing unit 156 determines the pixel locations of the multiple feature points in Image J at the layer using gradient information of the multiple feature points in Image I, where the order of the multiple feature points in the determination is based on the pixel locations of the multiple feature points in Image I. As discussed herein above, the order of the multiple feature points may be based on a raster scanning order, a zig-zag order, or another predetermined order of the pixel locations of the multiple feature points in Image I. In one embodiment, a feature point that occurs earlier in the order will be selected earlier in the determination than a feature point that occurs later in the order. The determination may be performed using the methods discussed herein above relating to FIG. 3.

At task box 3, the feature point control 150 orders the multiple feature points based on either (1) the pixel locations of the multiple feature points in Image J as determined in task box 2, or (2) the pixel locations of the multiple feature points in Image I.

Through these operations, the electronic device 102 determines the pixel locations of the multiple points at the layer for Image J. Additionally, the electronic device 102 determines an order of the multiple points, the order on which the subsequent feature tracking in layers of the image pyramids lower than the layer may be based.

Figure 9:
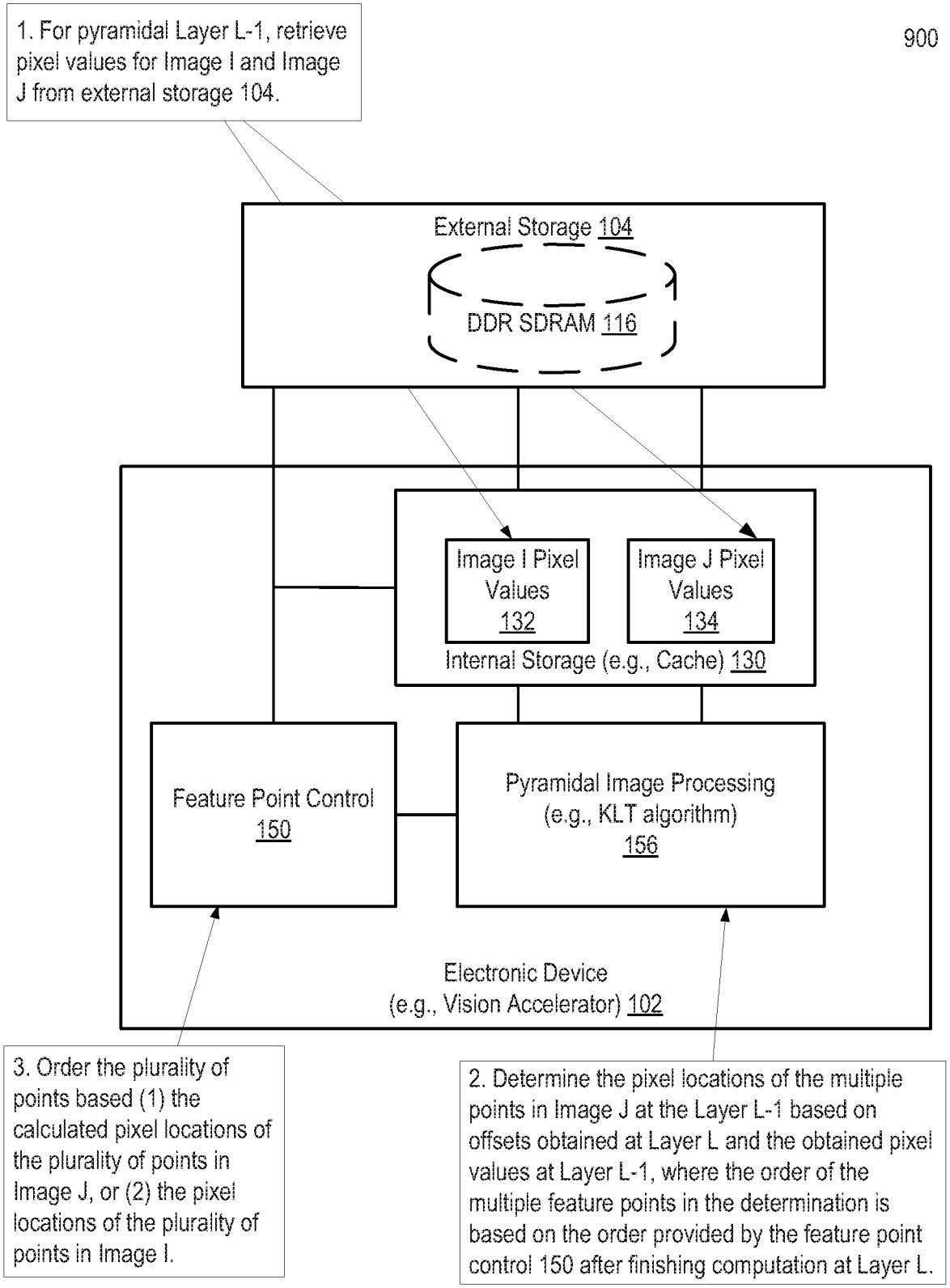
FIG. 9 illustrates operations of tracking multiple feature points at layers of the image pyramids according to one embodiment of the invention.

FIG. 9 illustrates operations of tracking multiple feature points at layers of the image pyramids according to one embodiment of the invention. The operations in the layers of the image pyramids are performed once the determination for feature tracking of multiple feature points at one upper layer (e.g., the topmost layer), Layer L, is completed (e.g., through the operations in FIG. 8). Task boxes 1-3 illustrate the order in which operations are performed according to one embodiment of the invention.

At task box 1, the internal storage 130 retrieves pixel values at pyramidal layer L−1 for Image I and Image J from the external storage 104. The retrieved pixel values for Image I and Image J may be stored in different locations in the internal storage 130. The amount of the pixel values retrieved depends on the computation performed in the pyramidal image processing unit 156 for the layer L−1.

At task box 2, the pyramidal image processing unit 156 determines the pixel locations of the multiple points in Image J at the Layer L−1 based on offsets obtained at Layer L and the obtained pixel values at Layer L−1. The order of the multiple feature points in the determination is based on the order provided by the feature point control 150 after finishing computation at Layer L. For a feature point, the offset obtained at Layer L is the pyramid guess obtained at reference 332 in the pseudo code 300 (e.g., using Equation (14)) in one embodiment. As discussed herein above relating to FIG. 3 (e.g., operations at references 308-314 and 320-332), the pixel values obtained at Layer L−1 from internal storage 130 are utilized to determine the expected pixel location of the feature point in Image J in one embodiment.

At task box 3, the feature point control 150 orders the multiple feature points based on either (1) the pixel locations of the multiple feature points in Image J as determined in task box 2, or (2) the pixel locations of the multiple feature points in Image I. The order of the feature points is to be provided to the external storage 104, internal storage 130, and/or the pyramidal image processing unit 156 for feature tracking at the next lower layer, Layer L−2 in this example. The operations in task boxes 1-3 repeat for Layer L−2 until the bottom layer of the image pyramids, Layer 0, is reached and the expected pixel locations of the multiple feature points are determined.

Through operations relating to task boxes 1-3 in FIG. 9, tracking multiple feature points in the layers can be completed thus the feature points are identified in Image J using the iterative processes through the multiple layers of the image pyramids. It is to be noted that while the feature point control 150 may be implemented in hardware (e.g., one or more electronic circuits), it may be implemented in software as well. In both cases, the feature point control 150 orders the plurality of feature points and provides the ordering information to the external storage 104 and/or internal storage 130.

Figure 10:
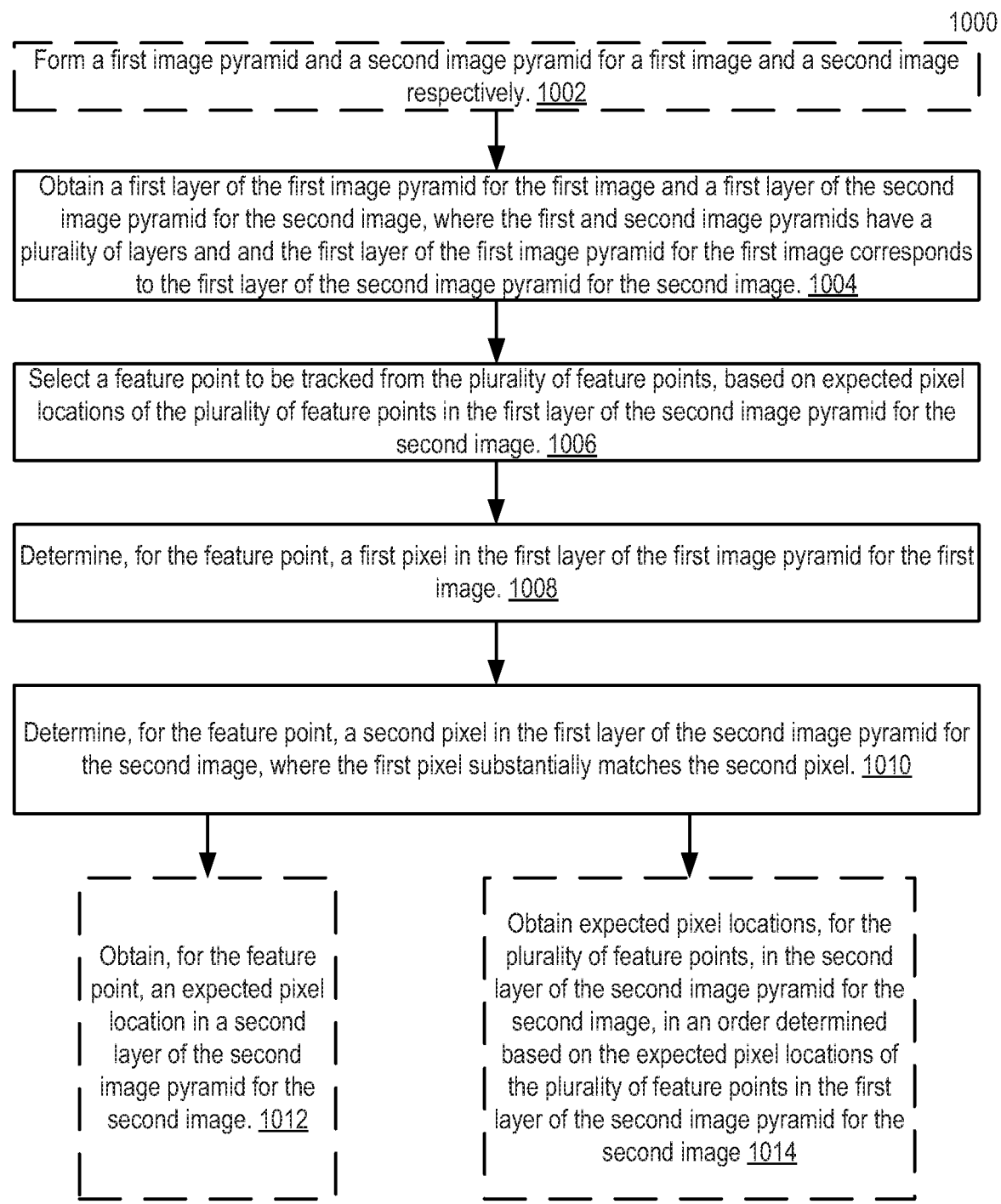
FIG. 10 is a flow diagram illustrating a method for tracking a plurality of feature points in a first image and a second image according to one embodiment of the invention.

FIG. 10 is a flow diagram illustrating a method for tracking a plurality of feature points in a first image and a second image according to one embodiment of the invention. Method 1000 may be implemented in an electronic device such as the electronic device 102. The first and second images may be referred to as Images I and J respectively.

At reference 1002, a first image pyramid and a second image pyramid are formed for the first and second images respectively. The image pyramids may be formed using operations discussed herein above relating to FIG. 2. The image pyramids may be stored in an external storage such as the external storage 104. In one embodiment, one or more top layers including the topmost layers are stored in an internal storage such as the internal storage 130.

At reference 1004, a first layer of the first image pyramid for the first image and a first layer of the second image pyramid for the second image are obtained. Both the first and second image pyramids have a plurality of layers and the first layer of the first image pyramid for the first image corresponds to the first layer of the second image pyramid for the second image. In one embodiment, the first and second image pyramids have the same number of layers. In an alternative embodiment, the first image pyramid has more layers than the second pyramid, or vice versa.

In one embodiment, the first layer of the first image pyramid for the first image and the first layer of the second image pyramid for the second image are obtained from a storage (e.g., an external storage). In one embodiment, the first layer of the first image pyramid for the first image and the first layer of the second image pyramid for the second image are obtained from a double data rate synchronous dynamic random-access memory (DDR SDRAM) of the storage.

In one embodiment, the obtained first layer of the first image pyramid for the first image and the first layer of the second image pyramid for the second image are stored in an internal storage of the electronic device. In one embodiment, the obtained first layer of the first and second image pyramids are stored in the form of pixel values of the obtained first layer of the first and second image pyramids.

At reference 1006, a feature point from the plurality of feature points is selected based on expected pixel locations of the plurality of feature points in the first layer of the second image pyramid for the second image.

In one embodiment, the feature point is selected based on an order of the expected pixel locations of the plurality of feature points in the first layer of the second image pyramid. In one embodiment, the feature point is selected over another feature point based on that the expected pixel location of the feature point is earlier than the other feature point in a raster scanning order or a zig-zag order of the pixel locations. In one embodiment, the expected pixel locations of the plurality of feature points in the first layer of the second image pyramid are determined based on offsets obtained at a layer immediately above the first layer of the second image pyramid. In one embodiment, the order of the pixel locations of the plurality of feature points in the layer immediately above the first layer of the second image pyramid is the order of the expected pixel locations of the plurality of feature points in the first layer of the second image pyramid. In one embodiment, for a feature point, the offset values may include information on one or more of an optical flow obtained for the feature point at the first layer of the second image pyramid (e.g., using Equation (13)) and a pyramid guess obtained for the feature point at the layer immediately above the first layer of the second image pyramid (e.g., using Equation (14)).

In one embodiment, the layer immediately above the first layer of the first image pyramid is a topmost layer of the first image pyramid. The expected pixel locations in the corresponding layer (e.g., the topmost layer) of the second image pyramid for the second image are obtained, for the plurality of feature points, in a pre-determined order. In one embodiment, the pre-determined order for the plurality of feature points is the storage order of pixel locations of the plurality of feature points in the topmost layer of the first image pyramid for the first image, Image I.

At reference 1008, for the feature point, a first pixel in the first layer of the first image pyramid for the first image is determined. In one embodiment, the first pixel in the first layer is determined based on how the image pyramids are formed. In one embodiment, the first pixel in the first layer of the first image pyramid is determined based on operations discussed herein above relating to reference 308 (e.g., using Equation (4)).

At reference 1010, for the feature point, a second pixel in the first layer of the second image pyramid for the second image is determined, and the first pixel substantially matches the second pixel. In one embodiment, the determination is based on the inner loop of the pseudo code 300 (e.g., using Equations (9) to (12)). As discussed herein above, multiple iterations may be performed to identify the second pixel in the first layer of the second image pyramid for the second image. The first pixel is determined to substantially match the second pixel when one or more conditions at reference 318 is satisfied in one embodiment.

In one embodiment, the determinations for the feature point at references 1008 and 1010 are based on pixel values obtained for the feature point at the first layer of the first image pyramid for the first image and the first layer of the second image pyramid for the second image. In one embodiment, obtaining the pixel values comprises obtaining pixel values of consecutive pixel locations in the first layer of the first image pyramid for the first image and/or the first layer of the second image pyramid for the second image.

The method 1000 may continue at 1012, where for the feature point, an expected pixel location in a second layer of the second image pyramid for the second image is determined. In one embodiment, the first layer of the first image pyramid is a layer immediately above a second layer of the first image pyramid, where the second layer of the first image pyramid corresponds to the second layer in the second image pyramid. In one embodiment, the expected pixel location for the feature point in the second layer of the second image pyramid for the second image is determined based on one or more offset values (e.g., the optical flow and/or pixel displacement guess) for the feature point obtained at the first layer.

In one embodiment, the expected pixel location for the feature point in the second layer of the second image pyramid is determined based on gradient information of the feature point at the first layer of the first image. In one embodiment, the determination is based on operations discussed herein above relating to references 310 to 314 (e.g., using Equations (5) to (7)).

In one embodiment, the determination of the expected pixel location for the feature point in the second layer of the second image pyramid comprises obtaining an optical flow information at the first layer of the second image pyramid. The optical flow information may be obtained through operations discussed herein above relating to reference 330 (e.g., using Equation (13)). Then based on the optical flow information at the first layer of the second image pyramid, one may determine the expected pixel location in the second layer of the second image pyramid. For example, the offset for the feature point such as the pyramidal guess for the second layer may be determined through operations discussed herein above relating to reference 332 (e.g., using Equation (14)).

The method may also continue at reference 1014, where for the plurality of feature points, the expected pixel locations are obtained in the second layer of the second image pyramid for the second image, in an order determined based on the expected pixel locations of the plurality of feature points in the first layer of the second image pyramid for the second image. In one embodiment, the order is a raster scanning order of the pixel locations of the plurality of feature points in the first layer. In an alternative embodiment, the order is a zig-zag order the pixel locations of the plurality of feature points in the first layer.

Once the expected pixel locations for the plurality of feature points are obtained in the second layer of the second image pyramid, the process may continue to the layer immediately lower than the second layer of the first image pyramid until the expected pixel locations for the plurality of feature points are obtained in the bottom layer of the image pyramid for the second image.

Figure 11:
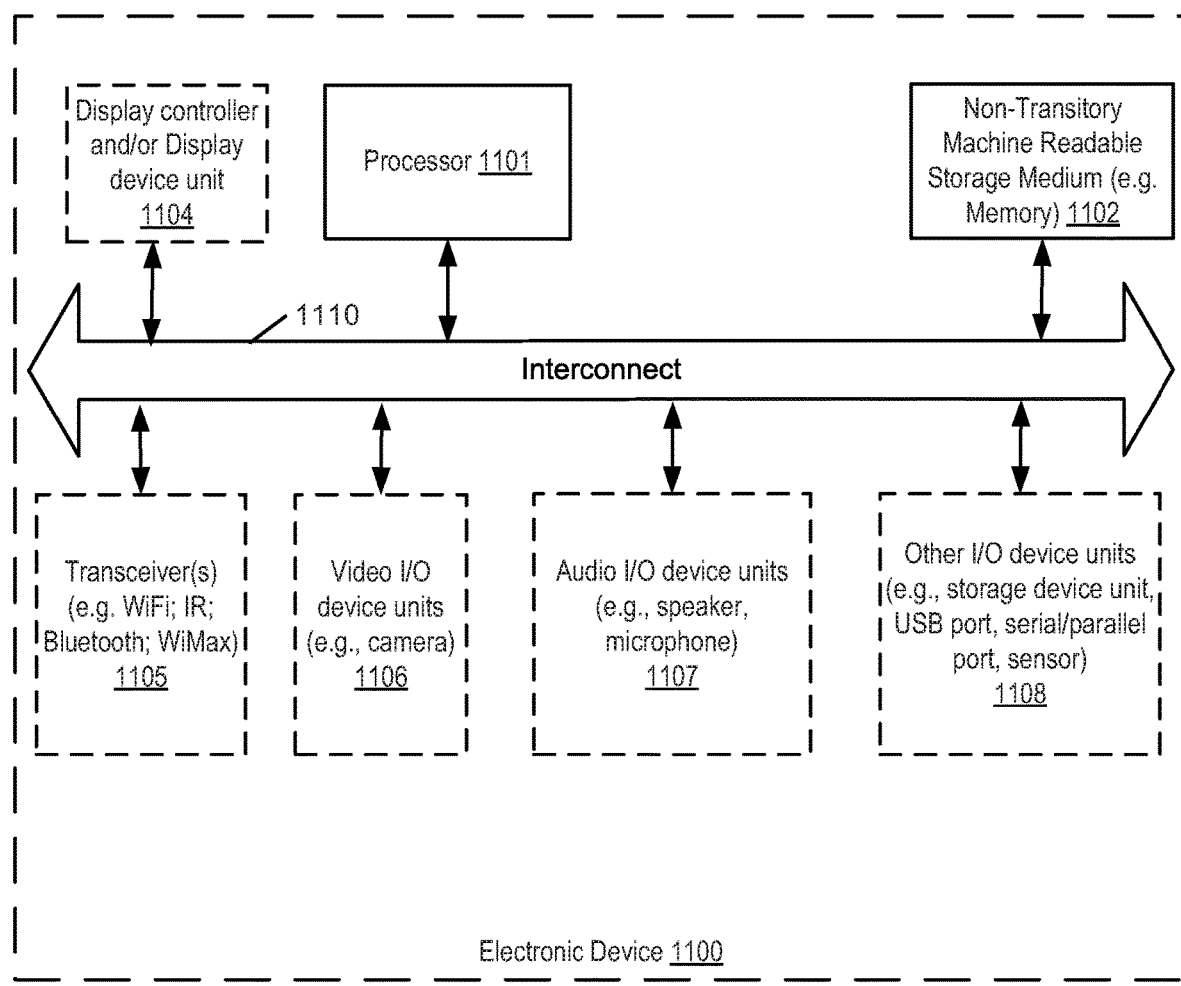
FIG. 11 is an exemplary illustration of an electronic device according to one embodiment of the invention.

FIG. 11 is an exemplary illustration of an electronic device according to one embodiment of the invention. The electronic device 1100 may perform similar functions as the electronic device 102, and it includes many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the electronic device 1100 is intended to show a high-level view of many components of the computing system. However, it is to be understood that additional components may be present in certain implementations and furthermore, different arrangements of the components shown may occur in other implementations. In one embodiment, the electronic device 1100 comprises a processor 1101 and non-transitory machine-readable storage medium 1102 that is coupled to the processor 1101.

In one embodiment, in addition to the processor 1101 and non-transitory machine-readable storage medium 1102, the electronic device 1100 includes optional devices 1104 to 1108 that are interconnected via a bus or an interconnect 1110. The processor 1101 represents one or more general-purpose processors such as a central processing unit (CPU), or processing device. More particularly, the processor 1101 may be a complex instruction set computing (CISC) microprocessor, reduced instruction set computing (RISC) microprocessor, very long instruction word (VLIW) microprocessor, or microprocessor implementing other instruction sets, or microprocessors implementing a combination of instruction sets. The processor 1101 may be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

The processor 1101 may communicate with the non-transitory machine-readable storage medium 1102 (also called computer-readable storage medium), such as magnetic disks, optical disks, read only memory (ROM), flash memory devices, and phase change memory. The non-transitory machine-readable storage medium 1102 may store information including sequences of instructions, such as computer programs, that are executed by the processor 1101, or any other device units. For example, executable code and/or data of a variety of operating systems, device drivers, firmware (e.g., input output basic system or basic input/output system (BIOS)), and/or applications can be loaded in the processor 1101 and executed by the processor 1101. Additionally, the non-transitory machine-readable storage medium 1102 may also include the external storage 104 (e.g., including a DDR SDRAM) discussed herein above.

The non-transitory machine-readable storage medium 1102 contains instructions, which when executed by a processor such as the processor 1101, cause the electronic device 1100 to perform operations. The operations include obtaining data for a first layer of a first image pyramid for the first image and a first layer of a second image pyramid for the second image, where both the first and second image pyramids have a plurality of layers and the first layer of the first image pyramid for the first image corresponds to the first layer of the second image pyramid for the second image. In one embodiment, the non-transitory machine-readable storage medium 1102 contains a storage such as the internal storage 130 (e.g., a cache), which is configured to store the obtained data for the first layer of the first image pyramid for the first image and the first layer of the second image pyramid for the second image. The operations further include selecting a feature point from the plurality of feature points, based on expected pixel locations of the plurality of feature points in the first layer of the second image pyramid for the second image. The operations further include determining, for the feature point, a first pixel in the first layer of the first image pyramid for the first image and a second pixel in the first layer of the second image pyramid for the second image based on the obtained data, wherein the first pixel substantially matches the second pixel.

In one embodiment, another storage such as the external storage 104 is included in the non-transitory machine-readable storage medium 1102. The other storage is configured to store the first and second image pyramids formed for the first and second image pyramids respectively. The other storage stores the data for the first layer of the first image pyramid for the first image and the first layer of the second image pyramid for the second image in one embodiment. The electronic device 1100 obtains the data for the first layer of the first image pyramid for the first image and the first layer of the second image pyramid for the second image from the other storage. Then through the processor 1101, the electronic device 1100 determines the expected pixel in a second layer of the second image pyramid for the second image for the feature point.

In one embodiment, the electronic device 1100 performs the operations discussed herein above relating to FIG. 10, and obtains the expected pixel locations for the plurality of feature points are obtained in the bottom layer of the image pyramid for the second image, thus tracks the plurality of feature points in the second image.

The electronic device 1100 may optionally further include display control and/or display device unit 1104, transceiver(s) 1105, video input/output (I/O) device unit(s) 1106, audio I/O device unit(s) 1107, and other I/O device units 1108 as illustrated. The transceiver 1105 may be a wireline transceiver or a wireless one such as a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 1106 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. The video I/O device unit 1106 may be a camera/camcorder (e.g., standard definition (SD) or high definition (HD) such as 4K, 8K or higher) in one embodiment.

An audio I/O device unit 1107 may include a speaker and/or a microphone to facilitate voice-enabled functions, such as voice recognition, voice replication, digital recording, and/or telephony functions. Other optional I/O devices 1108 may include a storage device (e.g., a hard drive, a flash memory device), universal serial bus (USB) port(s), parallel port(s), serial port(s), a printer, a network interface, a bus bridge (e.g., a PCI (peripheral component interconnect)—PCI bridge), sensor(s) (e.g., one or more of a positioning sensor, a motion sensor such as an accelerometer, an inertial sensor, an image sensor, a gyroscope, a magnetometer, a light sensor, a compass, a proximity sensor, a thermal sensor, an altitude sensor, and an ambient light sensor), or a combination thereof. The positioning sensor may be for a positioning system such as global positioning system (GPS), global navigation satellite system (GLONASS), Galileo, Beidou, or GPS aided Geo Augmented Navigation (GAGAN). The other optional I/O devices 1108 may further include certain sensors coupled to the interconnect 1110 via a sensor hub (not shown), while other devices such as a thermal sensor, an altitude sensor, an accelerometer, and an ambient light sensor may be controlled by an embedded controller (not shown), dependent upon the specific configuration or design of the electronic device 1100.

Figure 12:
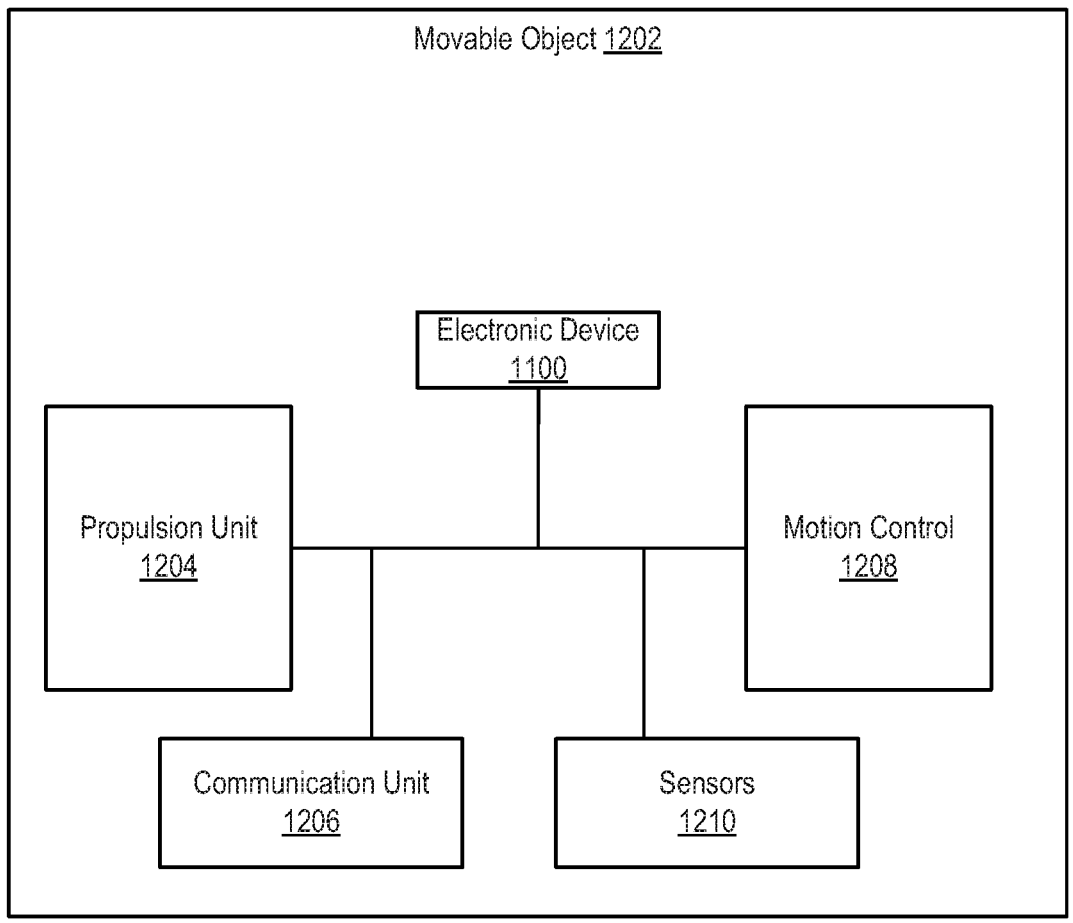
FIG. 12 is an exemplary illustration of a movable object according to one embodiment of the invention.

The electronic device 1100 may be implemented in a movable object. FIG. 12 is an exemplary illustration of a movable object according to one embodiment of the invention. The movable object 1202 includes the electronic device 1100 discussed herein above in one embodiment. The movable object 1202 also includes one or more of a propulsion unit 1204, a motion control 1208, a communication unit 1206 and one or more sensors 1210, each of which may include one or more circuits.

The propulsion unit 1204 of the movable object 1202 may include one or more devices or systems operable to generate forces for sustaining controlled movement of the movable object 1202. The propulsion unit 1204 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. The propulsion unit 1204 may also include one or more rotary components connected to the power source and configured to participate in the generation of forces for sustaining controlled motion (e.g., flight or moving along a surface). For instance, rotary components may include rotors, propellers, blades, nozzles, etc., which may be driven on or by a shaft, axle, wheel, hydraulic system, pneumatic system, or other component or system configured to transfer power from the power source. The propulsion unit 1204 and/or rotary components may be adjustable with respect to each other and/or with respect to the movable object 1200. The propulsion unit 1204 may be configured to propel the movable object 1202 in one or more vertical and horizontal directions and to allow the movable object 1202 to rotate about one or more axes. That is, the propulsion unit 1204 may be configured to provide lift and/or thrust for creating and maintaining translational and rotational movements of the movable object 1202.

The motion control 1208 of the movable object 1202 may convert a command (which is intuitive to a remote operator of the movable object) into one or more motion control signals or motion parameters that can be directly used to adjust the motion of the movable object. A motion control signal or motion parameters may control one or more aspects of motion achievable by a movable object. For example, through a motion control signal or motion parameters, the motion control 1208 may direct the movable object 1202 (e.g., through controlling the propulsion unit 1204) to move at a desired translational movement (at a vertical, a horizontal, or an angled direction), a desired rotational movement, desired speed, and/or desired acceleration.

The communication unit 1206 of the movable object 1202 may enable communications of data, information, commands, and/or other types of signals between the movable object 1202 (e.g., the motion control 1208 specifically) and a remote terminal of the movable object 1202. The communication unit 1206, implemented in one or more circuits in one embodiment, may communicate with the remote terminal via one or more communication networks, such as radio, cellular, Bluetooth, Wi-Fi, radio-frequency identification (RFID), and/or other types of communication networks usable to transmit signals indicative of data, information, commands, and/or other signals.

The sensors 1210 include one or more sensors implemented in the movable object 1202, and one sensor may be one of a positioning sensor, a motion sensor such as an accelerometer, an inertial sensor, an image sensor, a gyroscope, a magnetometer, a light sensor, a compass, a proximity sensor, a thermal sensor, an altitude sensor, and an ambient light sensor. The sensors 1210 generate data and information to be used to determine information about the movable object 1202, its component(s), or its target(s). The communication unit 1206 may communicate the generated data and information to other units of the movable object 1202 (e.g., the electronic device 1100, the propulsion unit 1204, the motion control 1208) or the remote terminal of the movable object 1202. In one embodiment, the feature tracking of multiple feature points in the electronic device 1100 may be performed on feature points obtained from the movable object 1202 (e.g., from the sensors 1210).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for tracking a plurality of feature points in a first image and a second image, comprising:
    obtaining a first layer of a first image pyramid for the first image and a first layer of a second image pyramid for the second image, wherein both the first and second image pyramids have a plurality of layers and the first layer of the first image pyramid for the first image corresponds to the first layer of the second image pyramid for the second image;
    selecting a feature point from the plurality of feature points, based on expected pixel locations of the plurality of feature points in the first layer of the second image pyramid for the second image; and
    determining, for the feature point, a first pixel in the first layer of the first image pyramid for the first image and a second pixel in the first layer of the second image pyramid for the second image, wherein the second pixel is a matching point of the first pixel.

2. The method of claim 1, further comprising:
    forming the first and second image pyramids for the first and second images respectively.

3. The method of claim 1, wherein the first and second image pyramids have a same number of layers.

4. The method of claim 1, wherein a layer immediately above the first layer of the first image pyramid is a topmost layer of the first image pyramid.

5. The method of claim 1, further comprising:
    obtaining, for the feature point, an expected pixel location in a second layer of the second image pyramid for the second image.

6. The method of claim 5, wherein the first layer of the first image pyramid is a layer immediately above a second layer of the first image pyramid, wherein the second layer of the first image pyramid corresponds to the second layer in the second image pyramid.

7. The method of claim 5, wherein the expected pixel location for the feature point in the second layer of the second image pyramid for the second image is determined based on an offset obtained at the first layer of the second image pyramid for the feature point.

8. The method of claim 5, wherein the expected pixel location for the feature point in the second layer of the second image pyramid is determined based on gradient information of the feature point at the first layer of the first image pyramid.

9. The method of claim 5, wherein the expected pixel location for the feature point in the second layer of the second image pyramid for the second image is determined based on optical flow information obtained for the feature point at the first layer of the second image pyramid.

10. The method of claim 1, further comprising:
obtaining expected pixel locations, for the plurality of feature points, in a second layer of the second image pyramid for the second image, in an order determined based on the expected pixel locations of the plurality of feature points in the first layer of the second image pyramid for the second image.

11. The method of claim 10, wherein the order is a raster scanning order or a zig-zag order.

12. The method of claim 1, wherein the first pixel and the second pixel are matched based on pixel values.

13. The method of claim 12, further comprising:
obtaining pixel values for pixels at consecutive pixel locations in the first layer of the second image pyramid for the second image.

14. The method of claim 1, wherein the first layer of the first image pyramid for the first image and the first layer of the second image pyramid for the second image are obtained from a storage.

15. The method of claim 14, wherein the first layer of the first image pyramid for the first image and the first layer of the second image pyramid for the second image are obtained from a double data rate synchronous dynamic random-access memory (DDR SDRAM) of the storage.

16. An electronic device to track a plurality of feature points in a first image and a second image, comprising:
a processor and a non-transitory machine-readable storage medium that is coupled to the processor, the non-transitory machine-readable storage medium containing instructions, which when executed by the processor, cause the electronic device to:
obtain data for a first layer of a first image pyramid for the first image and a first layer of a second image pyramid for the second image, wherein both the first and second image pyramids have a plurality of layers and the first layer of the first image pyramid for the first image corresponds to the first layer of the second image pyramid for the second image,
select a feature point from the plurality of feature points, based on expected pixel locations of the plurality of feature points in a first layer of a second image pyramid for the second image; and
determine, for the feature point, a first pixel in the first layer of the first image pyramid for the first image and a second pixel in the first layer of the second image pyramid for the second image based on the obtained data, wherein the second pixel is a matching point of the first pixel.

17. The electronic device of claim 16, further comprising a storage configured to store the first and second image pyramids formed for the first and second image pyramids respectively, wherein the electronic device is configured to store, in the storage, the data for the first layer of the first image pyramid for the first image and the first layer of the second image pyramid for the second image.

18. The electronic device of claim 17, wherein the storage comprises a double data rate synchronous dynamic random-access memory (DDR SDRAM) to store the first and second image pyramids.

19. The electronic device of claim 16, wherein a layer immediately above the first layer of the first image pyramid is a topmost layer of the first image pyramid.

20. A vision accelerator to track a plurality of feature points in a first image and a second image, the vision accelerator comprising:
a cache configured to store data for at least a first layer of a first image pyramid for the first image and a first layer of a second image pyramid for the second image, wherein both the first and second image pyramids have a plurality of layers and the first layer of the first image pyramid for the first image corresponds to the first layer of the second image pyramid for the second image; and
a circuit coupled to the cache, the circuit configured to
select a feature point from the plurality of feature points, based on expected pixel locations of the plurality of feature points in a first layer of a second image pyramid for the second image, and
determine, for the feature point, a first pixel in the first layer of the first image pyramid for the first image and a second pixel in the first layer of the second image pyramid for the second image, wherein the second pixel is a matching point of the first pixel.

\* \* \* \* \*